US012004097B2

(12) United States Patent
Park et al.

(10) Patent No.: US 12,004,097 B2
(45) Date of Patent: *Jun. 4, 2024

(54) MIXED SYNCHRONIZATION SIGNAL BLOCKS

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

This patent is subject to a terminal disclaimer.

(21) Appl. No.: 17/236,938

(22) Filed: Apr. 21, 2021

(65) Prior Publication Data

US 2021/0337487 A1 Oct. 28, 2021

Related U.S. Application Data

(60) Provisional application No. 63/014,067, filed on Apr. 22, 2020.

(51) Int. Cl.
*H04W 76/11* (2018.01)
*H04L 27/26* (2006.01)
*H04W 56/00* (2009.01)
*H04W 72/30* (2023.01)

(52) U.S. Cl.
CPC ..... *H04W 56/001* (2013.01); *H04L 27/26025* (2021.01); *H04W 72/30* (2023.01); *H04W 76/11* (2018.02)

(58) Field of Classification Search
CPC ... H04W 56/001; H04W 76/11; H04W 72/04; H04W 88/08; H04W 76/00; H04L 27/26025
See application file for complete search history.

(56) References Cited

U.S. PATENT DOCUMENTS

| 11,558,835 | B2  |   | 1/2023  | Park et al. |             |
|------------|-----|---|---------|-------------|-------------|
| 2018/0198575 | A1 | * | 7/2018  | Sheng       | H04J 11/0079 |
| 2018/0262313 | A1 | * | 9/2018  | Nam         | H04L 5/0044 |
| 2018/0288755 | A1 | * | 10/2018 | Liu         | H04W 56/0015 |
| 2018/0324678 | A1 | * | 11/2018 | Chen        | H04W 56/001 |
| 2018/0343671 | A1 |   | 11/2018 | Sun et al.  |             |

(Continued)

*Primary Examiner* — Hassan A Phillips
*Assistant Examiner* — Prenell P Jones
(74) *Attorney, Agent, or Firm* — Sevan Savsa; Loza & Loza LLP

(57) ABSTRACT

Aspects of the disclosure relate to configuring the structures of synchronization signal blocks (SSBs) and SSB burst sets in scenarios where two or more different types of SSB burst sets may be utilized in a wireless communication system (e.g., SSB burst sets including SSBs having different subcarrier spacing (SCS)). The SSB burst sets may be configured to include different components in an SSB (e.g., one or more of primary and second synchronization signals and a physical broadcast channel), include resource allocation information, include a physical-layer cell identity (PCID) configuration for a first SSB burst set that may be used to determine a PCID for a second SSB burst set, and enable quasi co-locating SSBs in a first SSB burst set with a second SSB burst set.

29 Claims, 19 Drawing Sheets

(56) References Cited

U.S. PATENT DOCUMENTS

| | | | | |
|---|---|---|---|---|
| 2019/0053271 | A1* | 2/2019 | Islam | H04W 74/0866 |
| 2019/0306832 | A1* | 10/2019 | Si | H04W 16/14 |
| 2020/0187302 | A1* | 6/2020 | Si | H04W 72/30 |
| 2020/0221405 | A1* | 7/2020 | Zarifi | H04W 56/001 |
| 2020/0228382 | A1* | 7/2020 | Lin | H04L 27/26025 |
| 2020/0329503 | A1* | 10/2020 | Da Silva | H04W 36/0055 |
| 2020/0351841 | A1* | 11/2020 | Cirik | H04W 48/08 |
| 2021/0014809 | A1* | 1/2021 | Lee | H04J 11/0069 |
| 2021/0385037 | A1* | 12/2021 | Yoon | H04W 74/0808 |
| 2022/0003830 | A1* | 1/2022 | Cha | H04B 17/24 |
| 2022/0015118 | A1* | 1/2022 | Park | H04W 72/046 |
| 2022/0022237 | A1* | 1/2022 | Kim | H04L 5/0053 |
| 2022/0053342 | A1* | 2/2022 | Kim | H04W 64/003 |
| 2022/0116979 | A1* | 4/2022 | Park | H04L 5/0044 |
| 2022/0232642 | A1* | 7/2022 | Ko | H04L 5/0053 |
| 2022/0239438 | A1* | 7/2022 | Cha | H04J 13/0029 |
| 2022/0256382 | A1* | 8/2022 | Kang | H04B 17/336 |
| 2022/0264491 | A1* | 8/2022 | Cha | H04W 56/001 |
| 2022/0272731 | A1* | 8/2022 | Cha | H04J 13/0025 |
| 2023/0053250 | A1* | 2/2023 | Kim | H04W 76/10 |

\* cited by examiner

MIXED SYNCHRONIZATION SIGNAL BLOCKS

CROSS REFERENCE TO RELATED APPLICATIONS

This application claims priority to and the benefit of U.S. Provisional Application No. 63/014,067 filed in the U.S. Patent and Trademark Office on Apr. 22, 2020, the entire contents of which are incorporated herein by reference as if fully set forth below in its entirety and for all applicable purposes.

TECHNICAL FIELD

The technology discussed below relates generally to wireless communication networks, and, more particularly, to the use of mixed or different synchronization signal blocks (SSBs) in these networks, such as using SSBs having different subcarrier spacings (SCSs).

INTRODUCTION

In particular wireless technologies and standards such as the evolving 3GPP 5G New Radio (NR) standard, particular high frequency transmission waveforms and protocols have been proposed, which extend into millimeter wavelengths (e.g., mmWave). As even higher RF carrier frequencies begin to be utilized, larger scaling for transmitted data may be needed to cover wider bandwidths. Of particular note, subcarrier spacing (SCS) used for transmission of particular signals and channels, such as synchronization signals (SS) and physical broadcast channels (PBCH) may be scaled up with the use of higher frequency transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a base station in a wireless communication network is disclosed. The method includes configuring a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set. Additionally, the method includes transmitting the first SSB burst set and the second SSB burst set to a user equipment (UE).

In another example, a base station configured for wireless communication, is disclosed having a processor, a transceiver communicatively coupled to the processor; and a memory communicatively coupled to the processor. The processor and the memory are configured to configure a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set. Additionally, the memory and the processor are configured to transmit the first SSB burst set and the second SSB burst set to a user equipment (UE).

In still another example, a method of wireless communication at a user equipment (UE) in a wireless communication network is disclosed. The method includes receiving a first synchronization signal block (SSB) burst set and a second synchronization signal block (SSB) burst set, wherein the first SSB burst set and the second SSB burst sets are each configured according to a respective set of parameters and the respective set of parameters differs between the first SSB burst set and the second SSB burst set. Further, the method includes identifying at least one characteristic of the second SSB burst set based on a configuration of the first SSB burst set.

In yet another example, a user equipment (UE) configured for wireless communication is disclosed having a processor, a transceiver communicatively coupled to the processor, and a memory communicatively coupled to the processor. The processor and the memory are configured to receive a first synchronization signal block (SSB) burst set and a second synchronization signal block (SSB) burst set, wherein the first SSB burst set and the second SSB burst sets are each configured according to a respective set of parameters and the respective set of parameters differs between the first SSB burst set and the second SSB burst set. Additionally, the memory and the processor are configured to identify at least one characteristic of the second SSB burst set based on a configuration of the first SSB burst set.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

Figure 1:
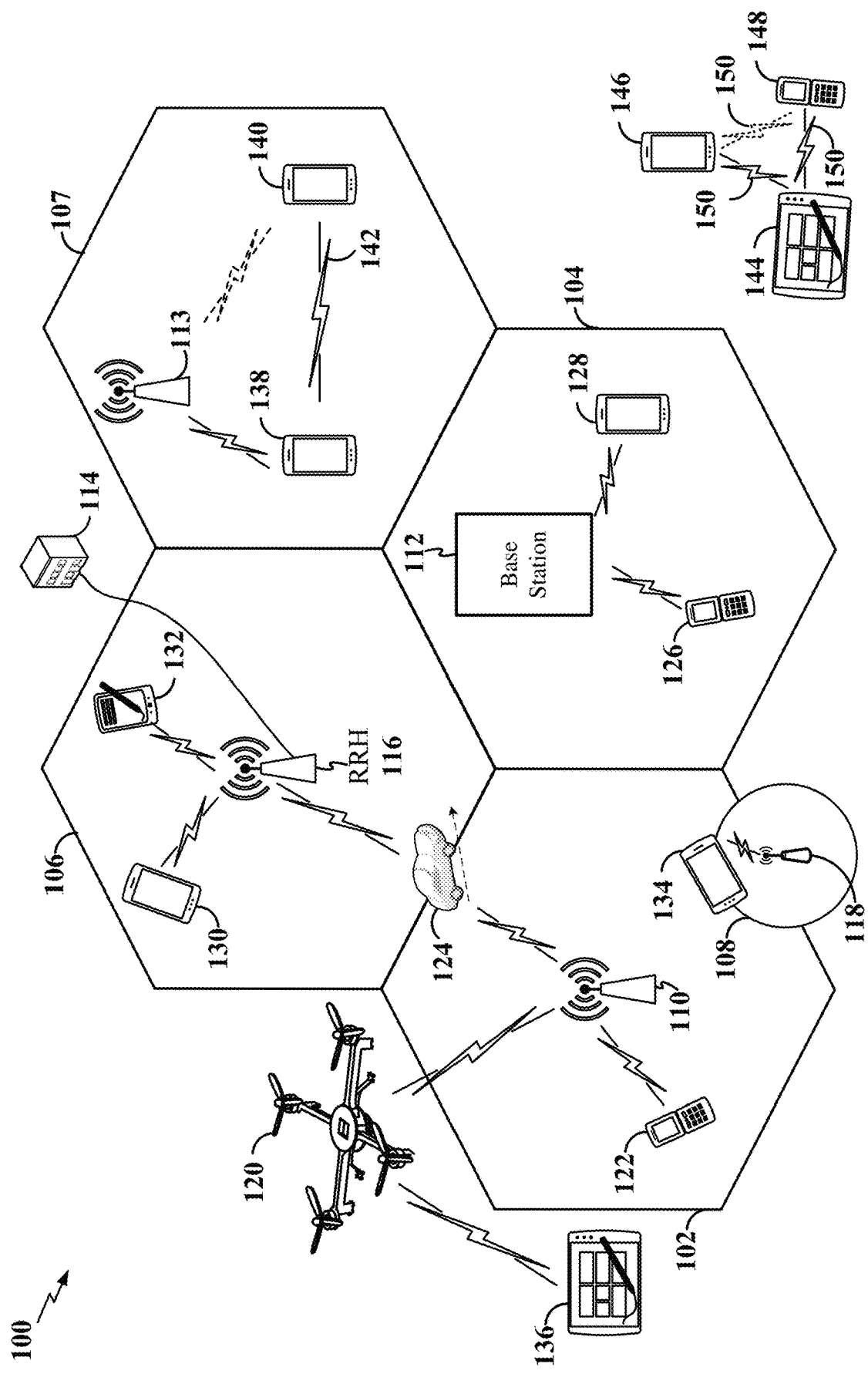
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Using larger SCSs provides advantages such as faster beam sweeping and lower search complexity in the frequency domain in a user equipment (UE). It is noted, however, that there are also some advantages to using smaller SCS such as better coverage (i.e., more energy in the time domain) and lower complexity in the time domain for a user equipment (UE) searching for the signals or channels. Accordingly, various aspects of the disclosure relate to the use of differing types of synchronization signal blocks (SSBs) and corresponding SSB burst sets (i.e., a set of SSBs) with both small and large subcarrier spacing (SCS). Further, aspects of the disclosure relate to methodologies that may be utilized for configuring the SSB burst set type, as well as methodologies of communicating the SSB burst set types to a user equipment (UE), for example, as will be described in more detail below.

While aspects and features are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, an illustration of a radio access network 100 is shown. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the one or more radio access networks shown in illustration 100 may be divided into a number of cellular regions (cells) that can be uniquely identified by a user equipment (UE) based on an identification broadcasted over a geographical area from one access point or base station. FIG. 1 illustrates macrocells 102, 104, 106, and 107, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, three base stations 110, 112, and 113 are shown in cells 102, 104, and 107, respectively; and a further base station 114 is shown controlling a remote radio head (RRH) 116 in cell 106. That is, a base station can have an integrated antenna or can be connected to an antenna or RRH by feeder cables or optical fiber. In the illustrated example, the cells 102, 104, 106, 107, and 114 may be referred to as macrocells, as the base stations 110, 112, 113, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is noted here that, according to some aspects, the RRH 116 maybe a remote radio transceiver that connects to an operator radio control panel.

Additionally, the RRH 116 may contain a base station's RF circuitry plus analog-to-digital/digital-to-analog converters and up/down converters. RRHs also may have operation and management processing capabilities and an interface to connect to the rest of the base station. Additionally, a cell, such as cell 106, may include multiple physical cell sites (e.g., multiple RRHs).

It is to be understood that the radio access network 100 may include any number of wireless base stations and cells. Further, a relay node may be deployed to extend the size or coverage area of a given cell. The base stations 110, 112, 113, 114, and/or 118 provide wireless access points to a core network for any number of mobile apparatuses. In some examples, the base stations 110, 112, 113, 114, and/or 118 may be the same as the base station/scheduling entity 208, which will be described below and illustrated in FIG. 2.

FIG. 1 further includes a mobile base station, which may be implemented with an unmanned aerial vehicle (UAV) 120, such as a quadcopter or drone. That is, in some examples, a cell may not necessarily be stationary, and the geographic area of the cell may move according to the location of a mobile base station such as the UAV 120.

In general, base stations may include a backhaul interface for communication with a backhaul portion (not shown in this figure) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. Further, each base station 110, 112, 113, 114, 118, and 120 may be configured to provide an access point to a core network (See e.g., core network 202, which will be described below in connection with FIG. 2) for all the UEs in the respective cells. For example, UEs 122 and 124 may be in communication with base station 110; UEs 126 and 128 may be in communication with base station 112; UEs 130 and 132 may be in communication with base station 114 by way of RRH 116; UEs 138 and 140 may be in communication with base station 113 (or in communication with the base station 113 via another UE, such as UE 140 in communication with base station 113 via UE 138 and link 142); UE 134 may be in communication with base station 118; and UE 136 may be in communication with mobile base station 120. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

The cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; UEs 138 and 140 may be in communication with base station 113, as well as with each other over a sidelink (SL) 142; and UE 136 may be in communication with mobile base station 120. Here, each base station 110, 112, 113, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 144, 146, and 148) may communicate with each other using peer to peer (P2P) or sidelink signals 150 without relaying that communication through a base station. In some examples, the UEs 144, 146, and 148 may each function as a scheduling entity or transmitting sidelink device and/or a scheduled entity or a receiving sidelink device to schedule resources and communicate sidelink signals 150 therebetween without relying on scheduling or control information from a base station. In other examples, two or more UEs (e.g., UEs 138 and 140) within the coverage area of a base station (e.g., base station 113) may also communicate sidelink signals 142 over a direct link (sidelink) without conveying that communication through the base station 113. In this example, the base station 113 may allocate resources to the UEs 138 and 140 for the sidelink communication. For example, the UEs 138 and 140 may function as scheduling entities or scheduled entities in a P2P network, a device-to-device (D2D), vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (e.g., base stations 110, 112, or 113). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (e.g., UE 122).

According to aspects, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In a network configured for UL-based mobility, UL reference signals from each UE may be utilized by the network to select a serving cell for each UE. In some examples, the base stations 110, 112, 113, or 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, 132, 138, and 140 may receive the unified synchronization signals, derive the carrier frequency, and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, 113, and/or 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
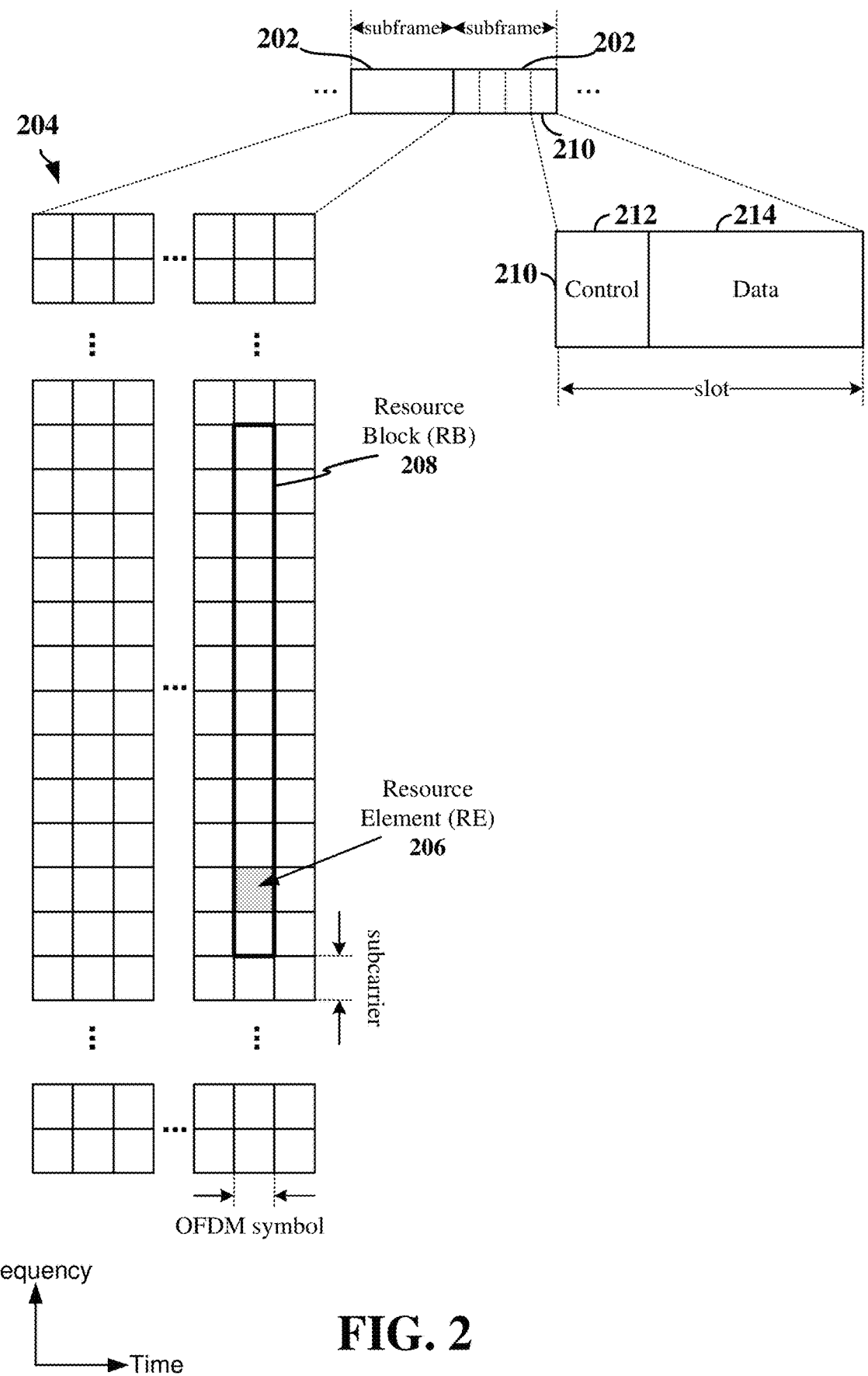
FIG. 2 is a schematic diagram illustrating organization of wireless resources in an air interface utilizing orthogonal frequency divisional multiplexing (OFDM) according to some aspects.

Referring to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs for downlink, uplink, or sidelink transmissions typically involves scheduling one or more resource elements 206 within one or more sub-bands. Thus, a UE device generally utilizes only a subset of the resource grid 204. In some examples, an RB may be the smallest unit of resources that can be allocated to a UE device. Thus, the more RBs scheduled for a UE device, and the higher the modulation scheme chosen for the air interface, the higher the data rate for the UE device. The RBs may be scheduled by a base station (e.g., gNB, eNB, etc.) or may be self-scheduled by a UE implementing D2D sidelink communication, for example.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one to three OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The simple structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
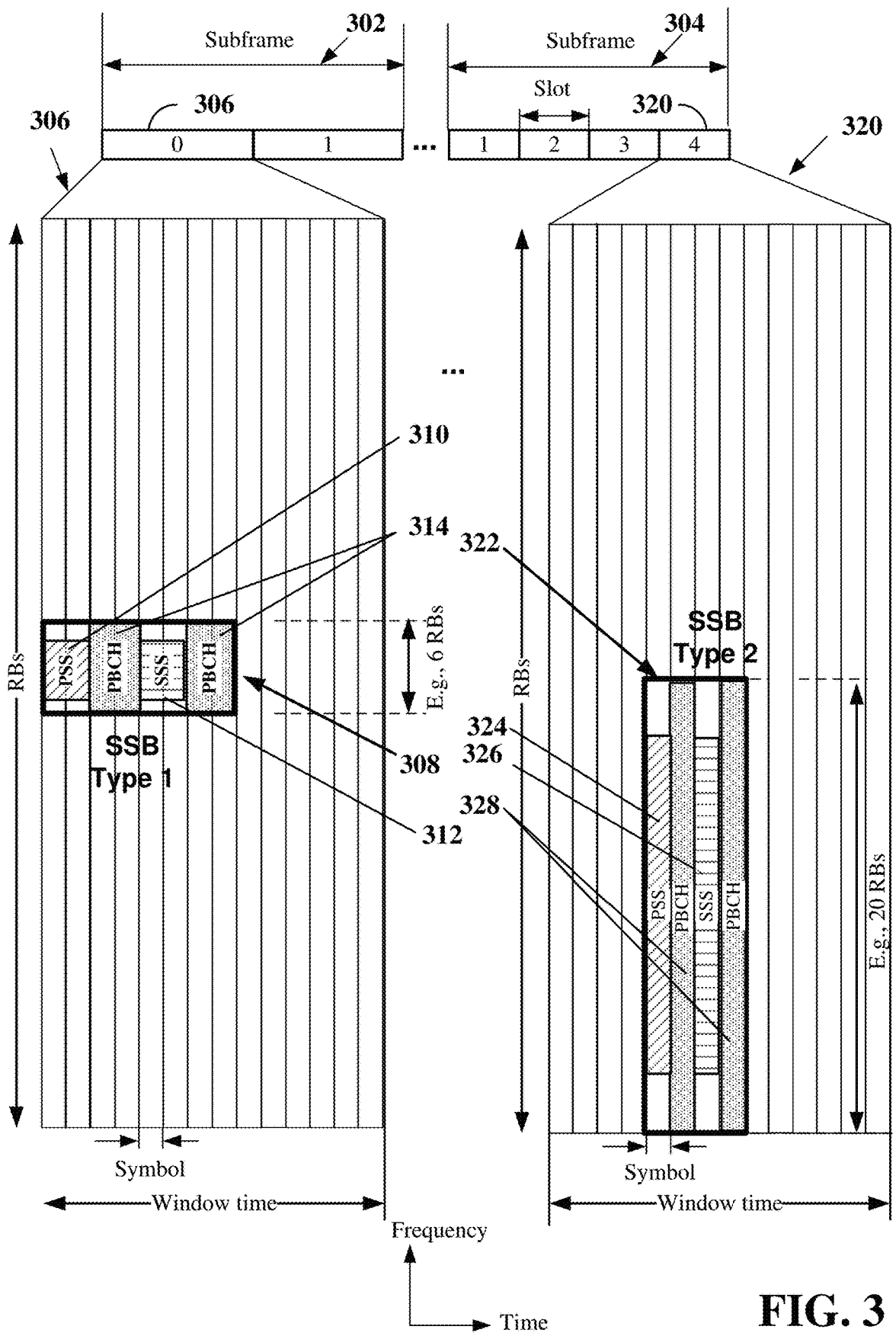
FIG. 3 illustrates a frequency/time resource grid showing wireless resources for transmission of synchronization signal blocks according to some aspects.

Examples of downlink (DL) channels or transmissions are illustrated in FIG. 3 based on certain representations, which are merely various representations of formats that could be used in 5G NR, but are not limited to such. In this illustration, portions of a radio frame are shown for illustration purposes; namely two subframes 302 and 304 of the frame, one containing two (2) slots 306 and the other containing four (4) slots 320, but not limited to such. The subframe duration may be fixed at 1 ms regardless of the SCS. The slot duration, however, may vary depending on SCS. For example, the number of slots in a subframe is 1, 2, 4, or 8 for respective 15, 30, 60, or 120 kHz SCS. It is noted that these numbers of subframes and slots are merely exemplary, and the disclosure is not limited to channels having any specific numerology or timings.

Slots 306 and 320 are expanded in this illustration to show additional detail in the time and frequency dimensions of at least two different structures for SSBs to which the present methods and apparatus may be applied. It is to be understood that these are not all of the channels that might be carried in a given slot, and it is not necessary that all of the described channels below would always appear in such a slot.

In the horizontal direction of FIG. 3, which represents the time domain or dimension, the example of slot 306 is subdivided into a number of OFDM symbols (e.g., 14 OFDM symbols regardless of SCS in the example illustrated) where the exact number of OFDM symbols per slot can vary to some extent based on the configuration of the symbols and specific numerology. The vertical direction represents the frequency domain or dimension. In OFDM, the frequency dimension is subdivided into orthogonal subcarriers, such that the intersection of one subcarrier and one OFDM symbol provides one resource element (RE). REs are grouped into resource blocks (RBs) as discussed before, where each RB may include a predefined number of subcarriers (e.g., 12 subcarriers) within one symbol. This illustration shows an entire system bandwidth for an exemplary carrier, where the given carrier has a system bandwidth greater than 6 RBs.

The illustrated slot 306 shows a first SSB 308 of a certain type (e.g., a "Type 1"), which may include a PSS 310, an SSS 312, and a physical broadcast channel (PBCH) 314. The PSS 310 and SSS 312 may provide for frequency and timing acquisition, including the determination of the carrier frequency and OFDM symbol, subframe, and frame timing. The PBCH 314 may carry a master information block (MIB) that may repeat every set number of frames or subframes and may include information relating to the overall DL transmission bandwidth and a system frame number (SFN). Additionally, the SSB 308 may convey additional information such as a Physical Cell ID (PCID).

The illustrated slot 320 shows another second type of SSB 322 (e.g., "Type 2") that may also be utilized in 5G NR. In this example, the SSB 322 includes a PSS 324, an SSS 326, and a PBCH 326. In the illustrated example, the SSB 322 may utilize 20 RBs, but is not limited to such.

It is noted here that while the SSB examples shown in FIG. 3 are shown as individual SSBs, it will be appreciated by those skilled in the art that these SSBs are just a portion of a predefined set of SSBs across the time domain, which is also known as an SSB burst set. In one example, multiple SSBs in the SSB burst are each respectively transmitted in four OFDM symbols across 240 subcarriers on the configured physical RBs. The SSB burst's periodicity in terms of time slots depends on which subcarrier spacing numerology is being utilized. As part of cell searching, typically a UE identifies the SSBs and then decodes the PSS and the SSS to decode time slot information and the PCID.

FIG. 3 is a grid of time and frequency resources illustrating differing types of SSBs with different subcarrier spacings (SCSs) that may be utilized in a wireless transmission frame or subframe. In this example, two subframes 308 and 322 with respective smaller and larger SCSs are shown, but further SSBs with other SCSs could also be used (i.e., 3 or more types of SSBs). In some examples, SSBs utilizing a smaller SCS, such as SSB 308, may provide better coverage as there is more energy in the time domain due to longer time duration, and may further provide a resultant lower searcher complexity in the time domain for searcher functionality in a UE, for example.

A larger SCS, on the other hand, may allow for faster beam sweeping. If the SSB SCS is different from the data SCS, an SSB with a larger SCS will block less data symbols compared to the smaller SCS case, as the larger SCS SSB occupies less symbols (i.e., less time). It is also noted that if the SSB SCS is the same as the data SCS, the SSB and data can be multiplexed in the frequency domain and sent simultaneously in the time domain. Another benefit of using a larger SCS is that this may lower the searcher complexity in the frequency domain (e.g., a sparser synchronization raster in the UE, for example, as the raster does not need to run through as many operating bands to identify an SSB burst).

According to certain aspects, two or more different types of SSBs may be utilized in a particular cell (e.g., cell 102 in FIG. 1). Each type of SSB may have different parameters, although it is also possible that different types of SSBs might have one or more shared parameter values. Examples of parameters that may be different among the SSB types include the SCS, location in the frequency domain, the SSB burst set periodicity, and/or the number of SSBs within an SSB burst set. Furthermore, the different SSB burst sets may be located together within a frame in one example. On the other hand, if location of differing SSB burst sets is not allowed, for example, one of the SSB burst sets could be omitted within a frame ignoring its SSB burst set period.

Additionally, it is noted that, different from the example in FIG. 3, the inclusion of the PBCH in an SSB type may be made optional. For example, a system may be configured such that only one of the SSB types includes the PBCH while the other SSB types do not. For example, an SSB type 1 having a small SCS may include the PBCH, while an SSB type 2 having a large SCS may not include the PBCH.

Figure 4:
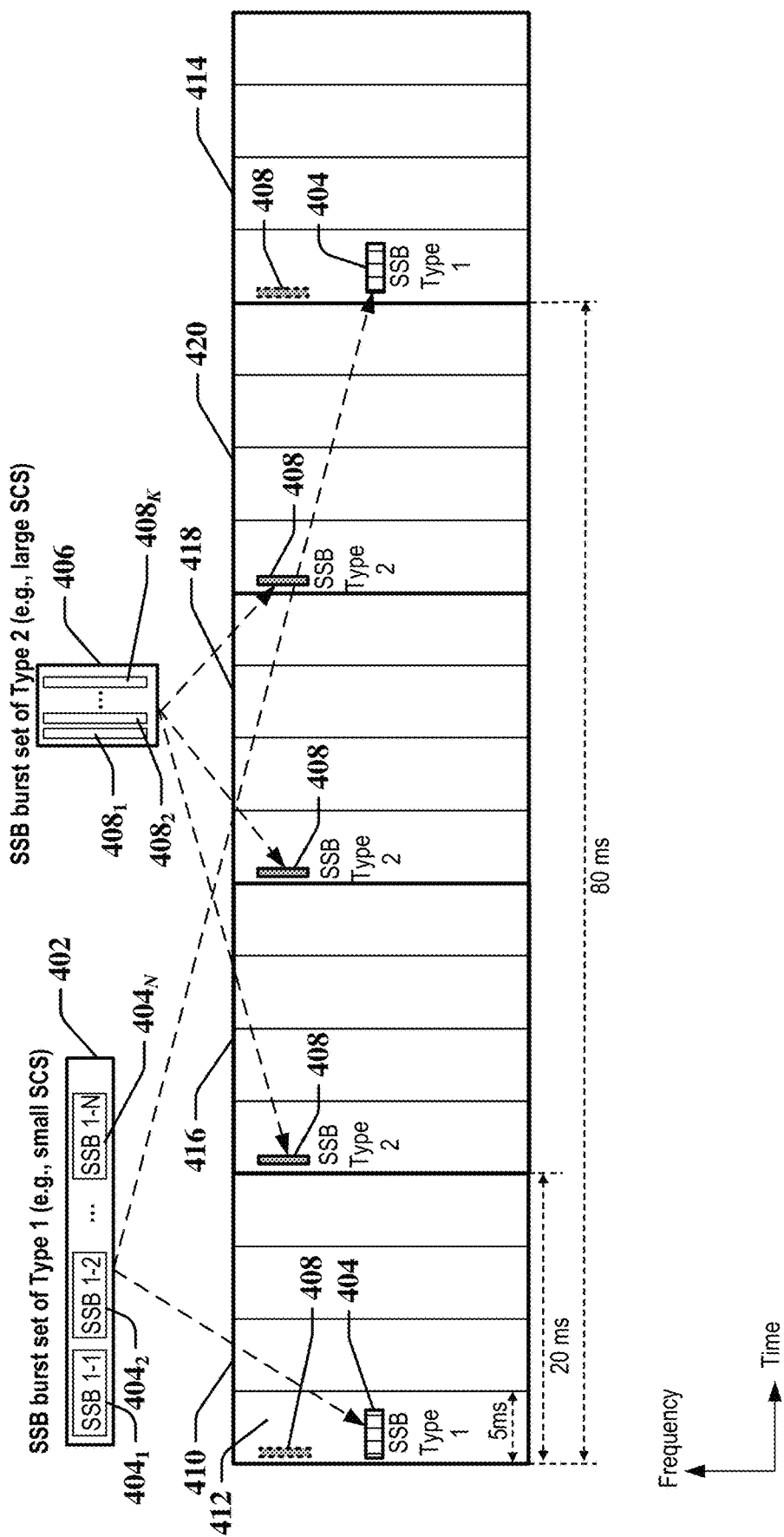
FIG. 4 is an illustration of an exemplary subframe or slot used in a wireless network showing some of the channels that may be carried in a slot or subframe of a particular frame according to some aspects.

FIG. 4 is a time/frequency diagram illustrating the use of at least two types of SSBs in a wireless communication system according to certain aspects. In this example, a set of type 1 SSBs 402 including a number of SSBs $404_1$-$404_N$ is configured according to certain parameters including a small SCS (e.g., 240 kHz), a longer SSB burst set periodicity (e.g., an SSB transmission every 80 ms), and an N number of SSBs 404 within the set 402. Additionally, the SSBs in SSB type 1 may include a PSS, SSS, and PBCH. Other parameters may include the condition to omit transmission in a frame if there is a concurrent transmission by another SSB type in that same frame. For the example of FIG. 4, it is assumed that this omission is not mandated for a type 1 SSB.

Additionally, a set of type 2 SSBs 406 including a number of SSBs $408_1$-$408_K$ is configured according to certain parameters including a large SCS (e.g., 960 kHz), a shorter SSB burst set periodicity (e.g., an SSB transmission every 20 ms), and a K number of SSBs 408 within the set 406. Additionally, the SSBs in SSB type 2 may be configured to include only a PSS and SSS. Again, other parameters may include the condition to omit transmission in a frame if there is a concurrent transmission by another SSB type in that same frame. For the example of FIG. 4, it is assumed that this omission is mandated for a type 2 SSB such that when a type 1 SSB (labeled with just 404 as no particular number in the burst set 402 is being denoted here) is within a frame, the type 2 SSB will be omitted in those frames where concurrent transmission might occur.

As shown in FIG. 4, a type 1 SSB 404 (labeled with just 404 as no particular number in the burst set 402 is being denoted here) is transmitted within a first frame 410. In particular, the type 1 SSB may be transmitted in a first subframe 412 (or other equivalent or known divisions of a frame in the relevant standards) of frame 410. Since, in this example, the type 2 SSBs 408 are omitted from concurrent transmission, an optional SSB 408 is illustrated within the first subframe 412. As the periodicity of the type 1 SSB burst set 402 is set at 80 ms in this example, the next SSB 404 in the set 402 is transmitted in frame 414. The type 2 SSBs 408 in burst set 406 (labeled with just 408 as no particular number in the burst set 406 is being denoted here) are transmitted within frames 4116, 418, and 420 as the periodicity for the type 2 burst set 406 is set at 20 ms.

Figure 5A:
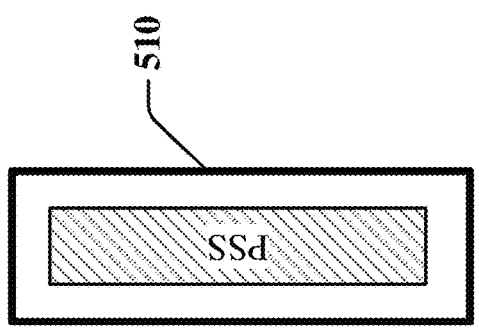
FIGS. 5A-5F illustrate various configurations for a synchronization signal block according to some aspects.
Figure 5B:
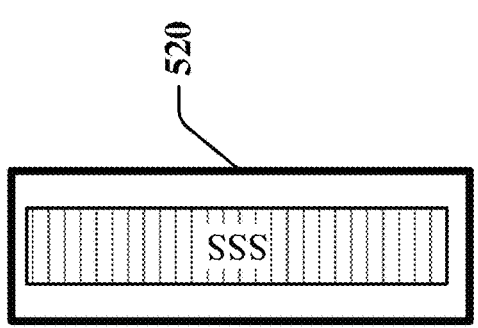
Figure 5C:
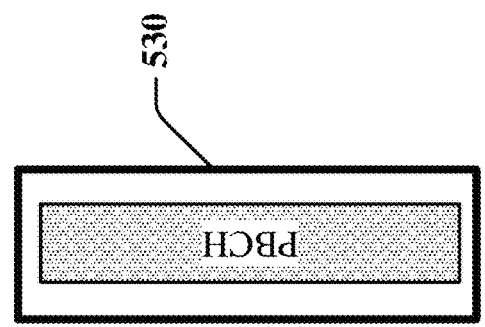
Figure 5D:
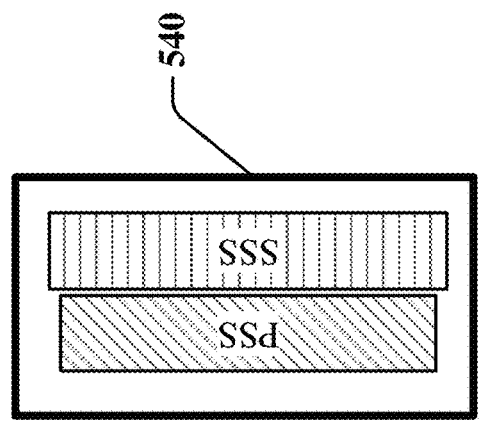
Figure 5E:
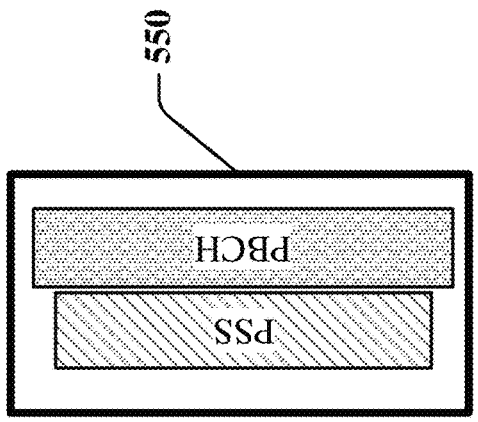
Figure 5F:
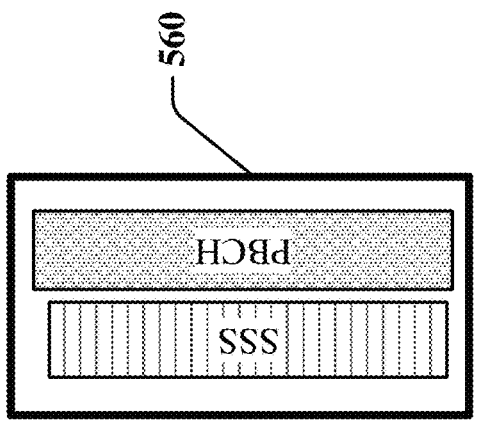

Further to the example illustrated by FIG. 4, it is noted that the SSBs for a type may be selectable or configurable in any of a number of combinations of the PSS, SSS, and PBCH. That is, in addition to a configuration of an SSB including the PSS, SSS, and PBCH such as was shown in the examples of FIG. 3, each SSB of an SSB burst set type may be configured to include one or more parts among the PSS, SSS, and PBCH. As an illustration of these configurations, FIGS. 5A-5F illustrate various permutations for configuring an SSB. As illustrated in the figures, FIG. 5A shows an SSB 510 having only a PSS, FIG. 5B shows an SSB 520 having only an SSS, FIG. 5C shows an SSB 530 having only a PBCH, FIG. 5D shows an SSB 540 having a PSS and SSS (similar to the example described above in connection with FIG. 4), FIG. 5E shows an SSB 550 having only a PSS and PBCH, and FIG. 5F illustrates and SSB 560 having only an SSS and PBCH. It is noted that the locations, sizing, and number of elements in each SSB as illustrated in FIGS. 5A-5F are merely exemplary and the disclosure is not limited to just these representations.

Figure 6:
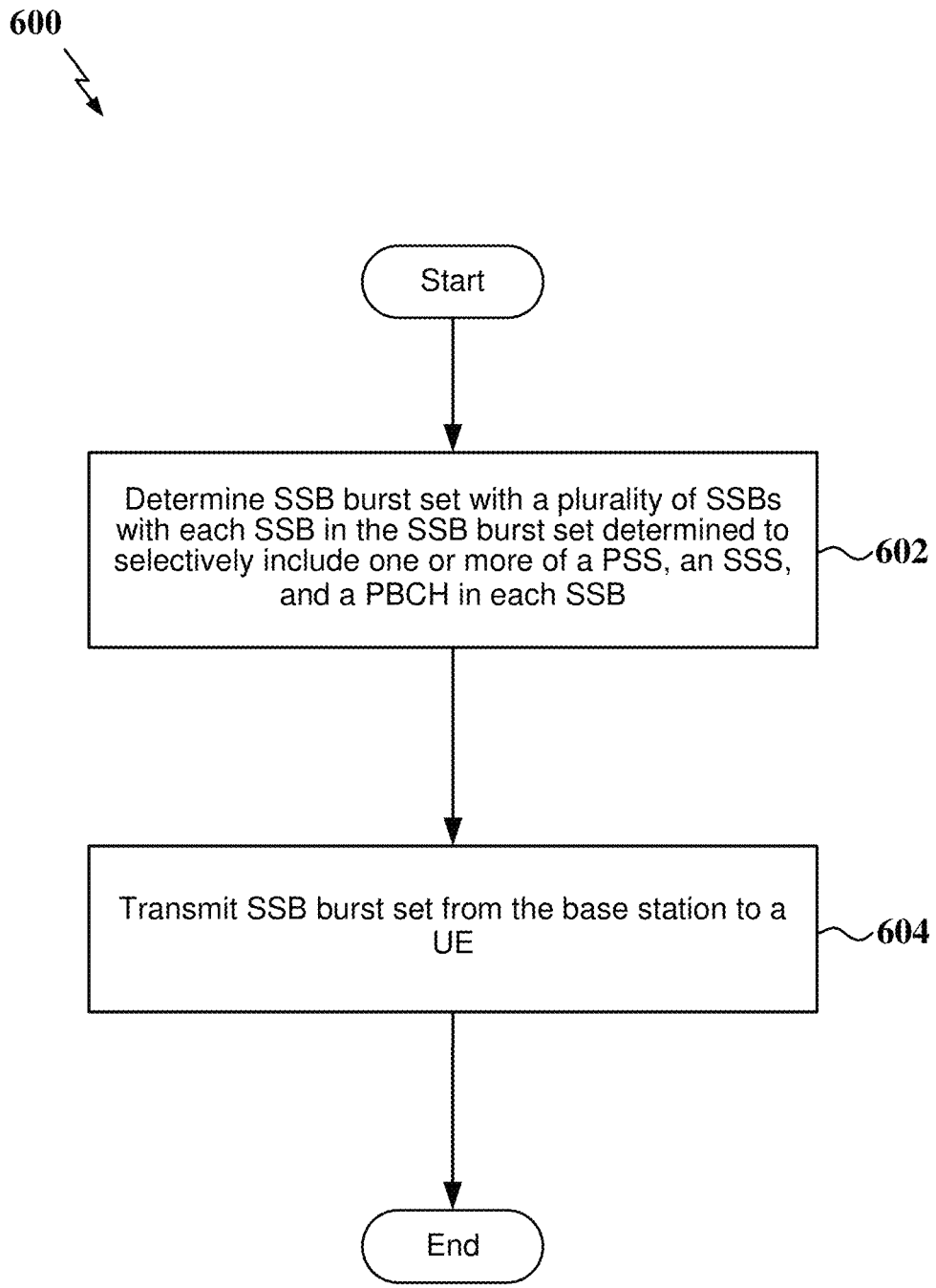
FIG. 6 is a flow chart of an exemplary method of wireless communication at a base station according to some aspects.

FIG. 6 illustrates a flow diagram of a method 600 of wireless communication that may be implemented by a base station such as base station 110 in FIG. 1 or a gNB (or any scheduling network entity or device that transmits SSB burst sets). Method 600 includes selective configuration of SSBs in an SSB burst set to include various combinations of the PSS, SSS, and PBCH as was illustrated in FIGS. 4 and 5A-5F, for example. Method 600 includes determining a first SSB burst set that includes a first plurality of SSBs as shown in block 602. The process of block 602 further includes that each SSB in the first SSB burst set is selectively determined to include one or more of a primary synchronization signal (PSS), a secondary synchronization signal (SSS), and a physical broadcast channel (PBCH) in each SSB. In other words, each SSB in an SSB burst set may be selectively configured to include either a single element, two elements, or all three elements of the PSS, SSS, and PBCH. In some aspects, all of the SSBs in a burst set are configured with the same elements (e.g., each SSB in an SSB burst set have a PSS and SSS), although it is contemplated that other configurations may be possible where each SSB in a set may be configured differently.

Method 600 further includes the transmission of the determined SSB burst set from the base station to a user equipment (UE) as shown in block 604. The SSBs received by a UE may then be identified using a synchronization raster, which indicates the frequency positions of the synchronization block that can be used by the UE for system acquisition when, for example, signaling of the synchronization block position is not present. The UE also may utilize the information in the SSB as part of system acquisition.

According to a further aspect, method 600 may also include that the process of determining the first SSB burst set further includes determining at least one of a period of transmission of SSBs within the first SSB burst set, a number of SSBs within the first SSB burst set, and a subcarrier spacing (SCS) for SSBs within the first SSB burst set. In yet further aspects, method 600 may further include determining, in the base station, a second SSB burst set including a second plurality of SSBs, wherein each SSB in the second SSB burst set is determined to selectively include one or more of a primary synchronization signal (PSS), a secondary synchronization signal (SSS), and a physical broadcast channel (PBCH) in each SSB. The second SBB burst set may include a different type of SSB such as in the example of FIG. 4. For example, one SSB type utilizes PSS/PBCH in each SSB whereas the other type utilizes only SSS for each SSB. Further differences could be that one type utilizes a smaller SCS and the other type an SCS larger than the other SSB burst set. In further aspects, method 600 may include transmitting the determined second SSB burst set from the base station to a user equipment (UE) concurrent with the first SSB burst set as was also illustrated in FIG. 4 (or with the conditional omission of two SSBs in a frame, if so configured).

Figure 7:
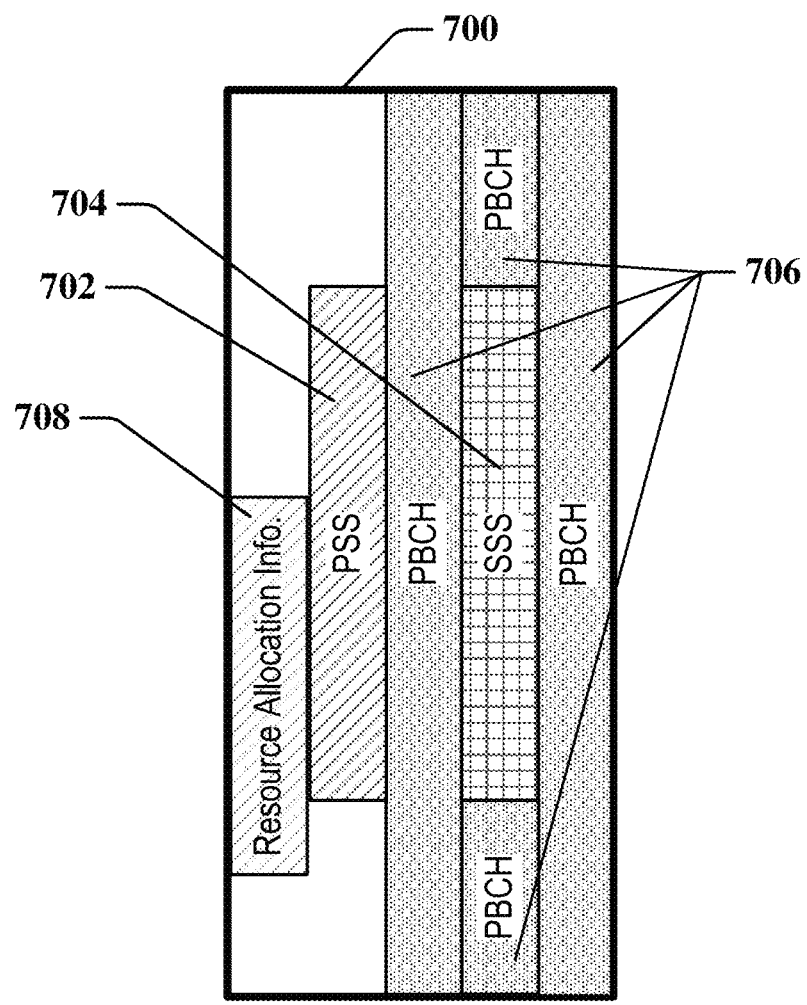
FIG. 7 illustrates the structure of an SSB that includes resource allocation information according to some aspects.

According to other aspects, one type of SSB burst set may be configured to include resource allocation information for other types of SSB burst sets. As an example, FIG. 7 illustrates the structure of an SSB 700 for a particular type of SSB that includes resource allocation information according to certain aspects. In this example, the SSB 700 may be an SSB Type 1 including a PSS 702, an SSS 704, and PBCH 706, although the structure is not limited to such and could be configured according to the previous examples of FIGS. 4-6. The SSB 700 further includes resource allocation information 708, which is shown at a particular time and frequency location within the SSB for illustration purposes, but is not limited to such. The resource allocation information 708 may be used to indicate the allocation information of at least one other SSB type (e.g., an SSB Type 2) that may be transmitted in the same communication system. Information that may be conveyed by the resource allocation information 708 may include SSB location (e.g., location of the SSB in time and frequency within a frame), SSB burst set periodicity, and SCS for the other SSB burst type set. With the SSB 700, if the UE detects one of the SSB types after searching all possible channel synchronization rasters where an SSB can be transmitted, the UE can then identify the location of other SSB types based on the detected SSB type and the resource allocation information, for example.

Figure 8:
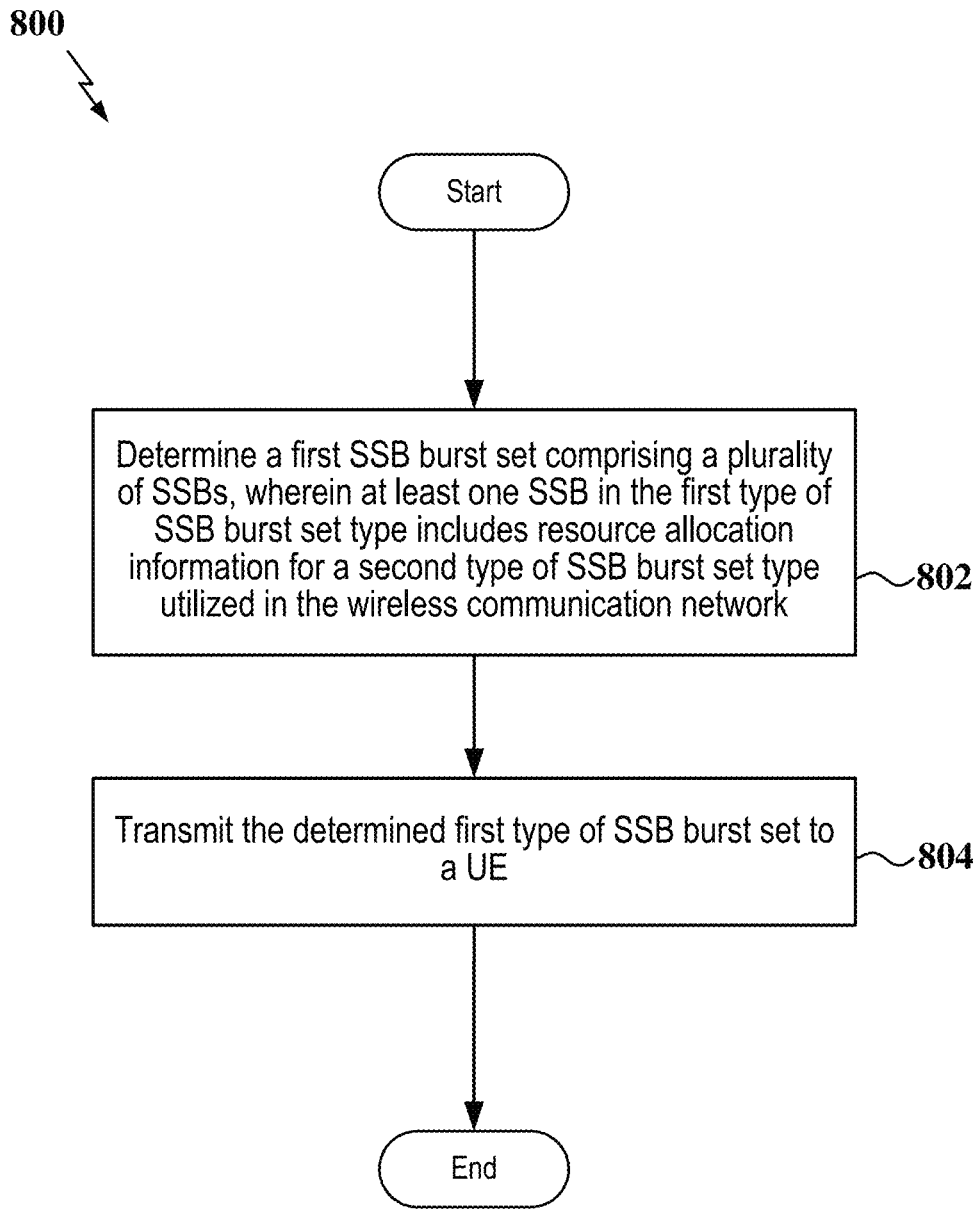
FIG. 8 is a flow chart of an exemplary method of wireless communication at a base station according to some aspects.

FIG. 8 is a flow chart of an exemplary method 800 of wireless communication at a base station in a wireless communication network according to certain aspects. Method 800 features the use of the resource allocation information 708 discussed above. As shown in FIG. 8, method 800 includes determining, in a base station, a first type of synchronization signal block (SSB) burst set including a plurality of SSBs, wherein at least one SSB in the first type of SSB burst set includes resource allocation information for a second type of SSB burst set type utilized in the wireless communication network as shown in block 802. The process(es) in block 802 may be implemented using a base station or gNB such as base station 110 in FIG. 1 or RAN entity or base station 1600 to be discussed later in connection with FIG. 16. Furthermore, method 800 includes transmitting the determined first type of SSB burst set from the base station to a user equipment (UE) in the communication network as shown at block 804.

Additionally, it is noted that method 800 may include the condition that the resource allocation information includes one or more of locations of SSBs in the second type of SSB burst set, a period of transmission of SSBs within the second type of SSB burst set, or the subcarrier spacing (SCS) of SSBs within the second type of SSB burst set. This information may then be utilized by the UE to identify and decode the second type of SSB burst set.

Figure 9:
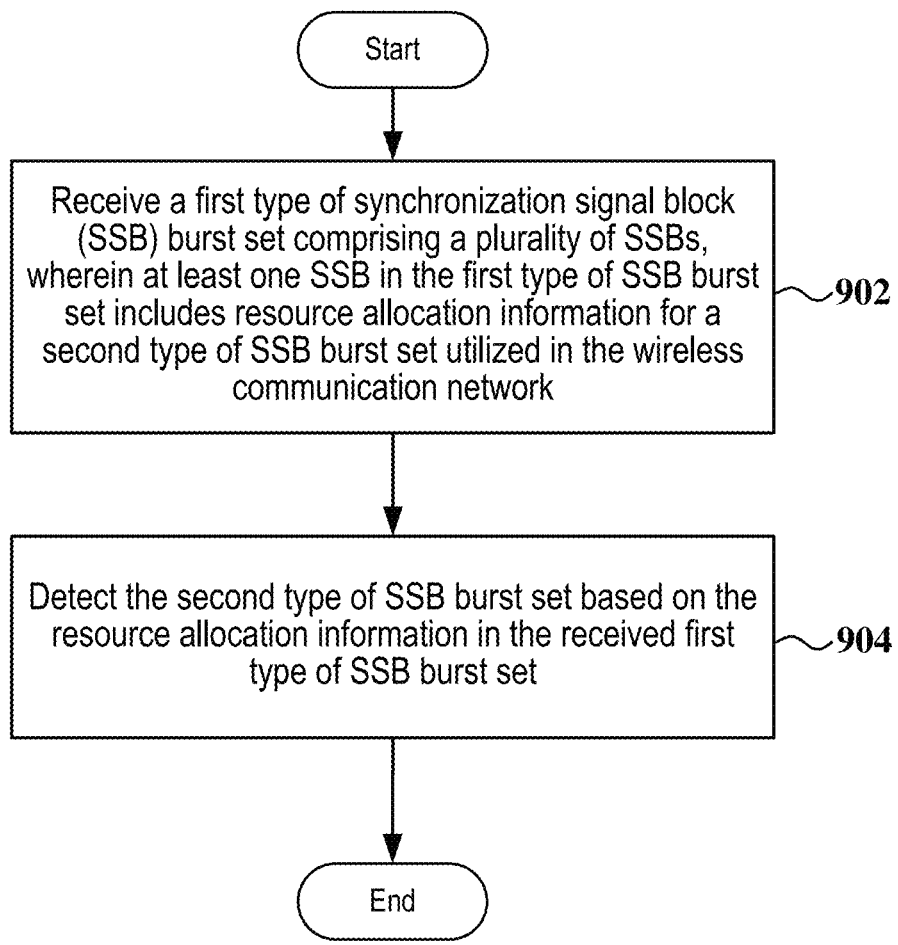
FIG. 9 is a flow chart of another exemplary method of wireless communication at a user equipment (UE) according to some aspects.

FIG. 9 is a flow chart of another exemplary method 900 of wireless communication at a UE according to certain aspects. According to certain aspects, method 900 may be implemented in a user equipment or some other device that receives and decodes SSBs, such as UEs 122, 130, 126, or 128 as examples from FIG. 1, or by UE or scheduled entity 1800 to be discussed later in connection with FIG. 18.

Method 900 includes receiving, in a user equipment (UE), a first type of synchronization signal block (SSB) burst set including a plurality of SSBs, wherein at least one SSB in the first type of SSB burst set includes resource allocation information for a second type of SSB burst set utilized in the wireless communication network as shown at block 902. Additionally, method 900 includes identifying and detecting the second type of SSB burst set based on the resource allocation information in the received first type of SSB burst set. In an aspect, the resource allocation information includes one or more of locations of SSBs in the second type of SSB burst set, a period of transmission of SSBs within the second type of SSB burst set, or the subcarrier spacing (SCS) of SSBs within the second type of SSB burst set.

In yet other aspects of the present disclosure, it is first noted that all types of SSB burst sets used in a communication network may be configured to indicate the same PCID. Nonetheless, different types of SSB burst sets may also be configured to indicate different PCIDs. In such case, a predetermined relationship between the PCID indicated by one type of SSB burst set and another PCID of another type of SSB burst set may be determined, preset, or established. In a particular example, the relationship among the different PCIDs (e.g., PCID 1 for a first type of SSB burst set and PCID 2 for a second type of SSB burst set) may be based on a modulo operation where {PCID 2 indicated by SSB Type 2}=mod ({PCID 1 indicated by SSB Type 1}+N, 1008). In this relationship, the number N is some predefined integer and the number 1008 in this example is the limit of the PCID values for known 5G NR systems, but this value is not limited to such and can be generalized as some maximum number M of PCID values for other or future systems. In an example, if M is assumed to be 1008 and N is set to 100, if a PCID 1 value is 1000, for example, using the modulo operation above, the PCID 2 for the second type of SSB burst set would yield a value of 92 (i.e., (1000+100)−1008), yielding the difference or remainder 92. A simple example is as follows: PCID1=1000, N=100, then PCID2=mod (1000+100,1008)=92. Given this operation, if the UE detects one of the PCIDs for a first type of SSB burst set, the UE can identify the other PCID for the second type of SSB burst set. While the modulo operation discussed here is one example, it is possible to utilize other predetermined relationships that will allow a UE to identify a PCID for a type of SSB burst set based on the detected PCID of the other type of SSB burst set and a predetermined relationship. In some aspects, the predetermined relationship may be set in a UE such that the UE already is predetermined to consider the relationship when receiving and decoding SSB burst sets. In other aspects, a base station may utilize radio resource control (RRC) signaling to the UE, as one example, to communicate the predetermined relationship to one or more UEs in a cell, for example, which subsequently utilize the predetermined relationship to determine the PCID of one type of SSB burst set from an identified PCID of another type of SSB burst set.

Figure 10:
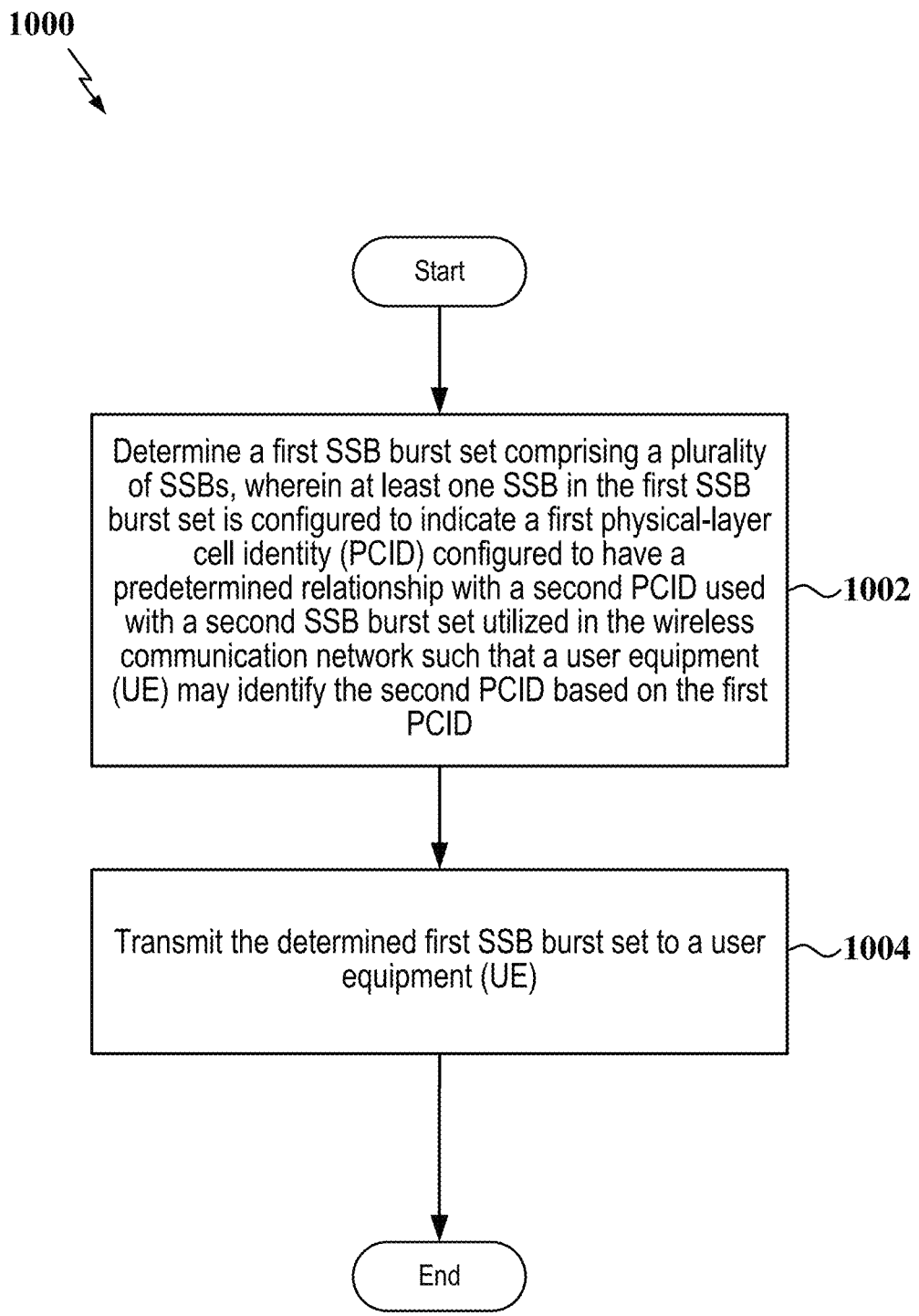
FIG. 10 is a flow chart of another exemplary method of wireless communication at a base station according to some aspects.

FIG. 10 is a flow chart of a method 1000 for wireless communication at a base station in a wireless communication network according to aspects of the disclosure. The method 1000 may be implemented in a base station or gNB, or any scheduling entity. As seen in block 1002, the method includes determining a first SSB burst set including a plurality of SSBs, wherein at least one SSB in the first SSB burst set is configured to indicate a first physical-layer cell identity (PCID) that is configured to have a predetermined relationship with a second PCID used with a second SSB burst set utilized in the wireless communication network such that a user equipment (UE) may identify the second PCID based on the first PCID. Furthermore, method 1000 may include transmitting the determined first SSB burst set from the base station to a user equipment (UE) as shown in block 1004.

Method 1000 may also include that the predetermined relationship includes that the second PCID=mod(the first PCID+N, M), where mod represents a modulo operation, N is a predetermined integer number, and M is a maximum number of possible PCIDs in the wireless communication network. This predetermined relationship may be established in a base station or gNB, and may also be communicated to the UE via RRC signaling.

Figure 11:
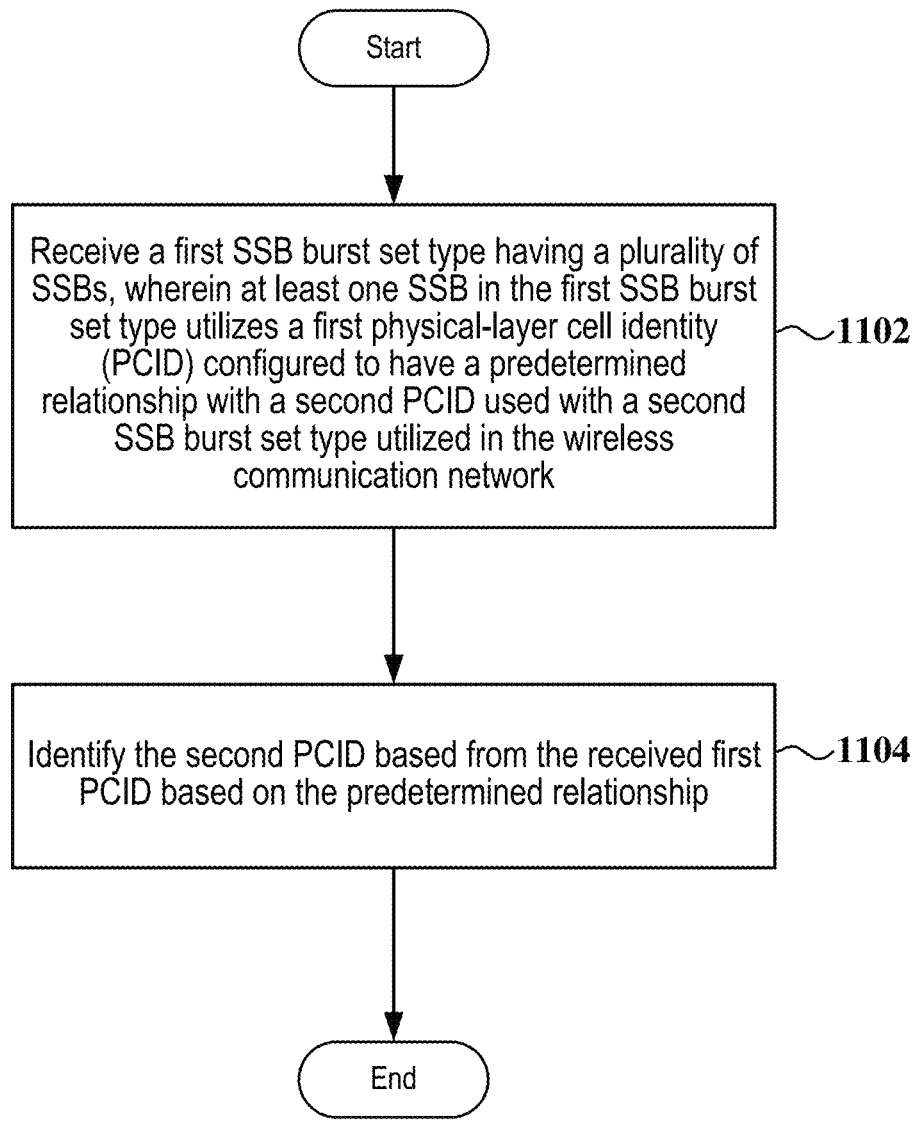
FIG. 11 is a flow chart of another exemplary method of wireless communication at a UE according to some aspects.

FIG. 11 illustrates another exemplary method 1100 that may be implemented in a wireless device such as a UE or other scheduled device for communication in a wireless communication network. The method 1100 includes receiving, in a user equipment (UE), a first synchronization signal block (SSB) burst set type including a plurality of SSBs, wherein at least one SSB in the first SSB burst set type utilizes a first physical-layer cell identity (PCID) configured to have a predetermined relationship with a second PCID used with a second SSB burst set type utilized in the wireless communication network as shown in block 1102. Additionally, method 1100 includes identifying the second PCID based from the received first PCID based on the predetermined relationship as shown in block 1104.

As with method 1000, method 1100 includes that the predetermined relationship comprises the second PCID=mod (the first PCID+N, M), where mod is a modulo operation, N is a predetermined integer number, and M is a maximum number of possible PCIDs in the wireless communication network.

In another aspect, it is noted that SSBs in one type of SSB burst set can be quasi co-located (QCLed) with corresponding SSBs in another type of SSB burst set. That is, an antenna port used for an SSB in one SSB burst set may be QCLed with an antenna port for a corresponding SSB in another SSB burst set. In other words, a transmit beam for an SSB from a first type of SSB burst set can be the same as the transmit beam for a corresponding SSB from a second type of SSB burst set. With this QCL configuration, properties of an SSB from one burst set can be inferred from a detected SSB from the other SSB burst set. Accordingly, a UE may be able to gain information concerning one type of SSB burst set through detection of a QCLed SSB from the other SSB burst set.

Figure 12:
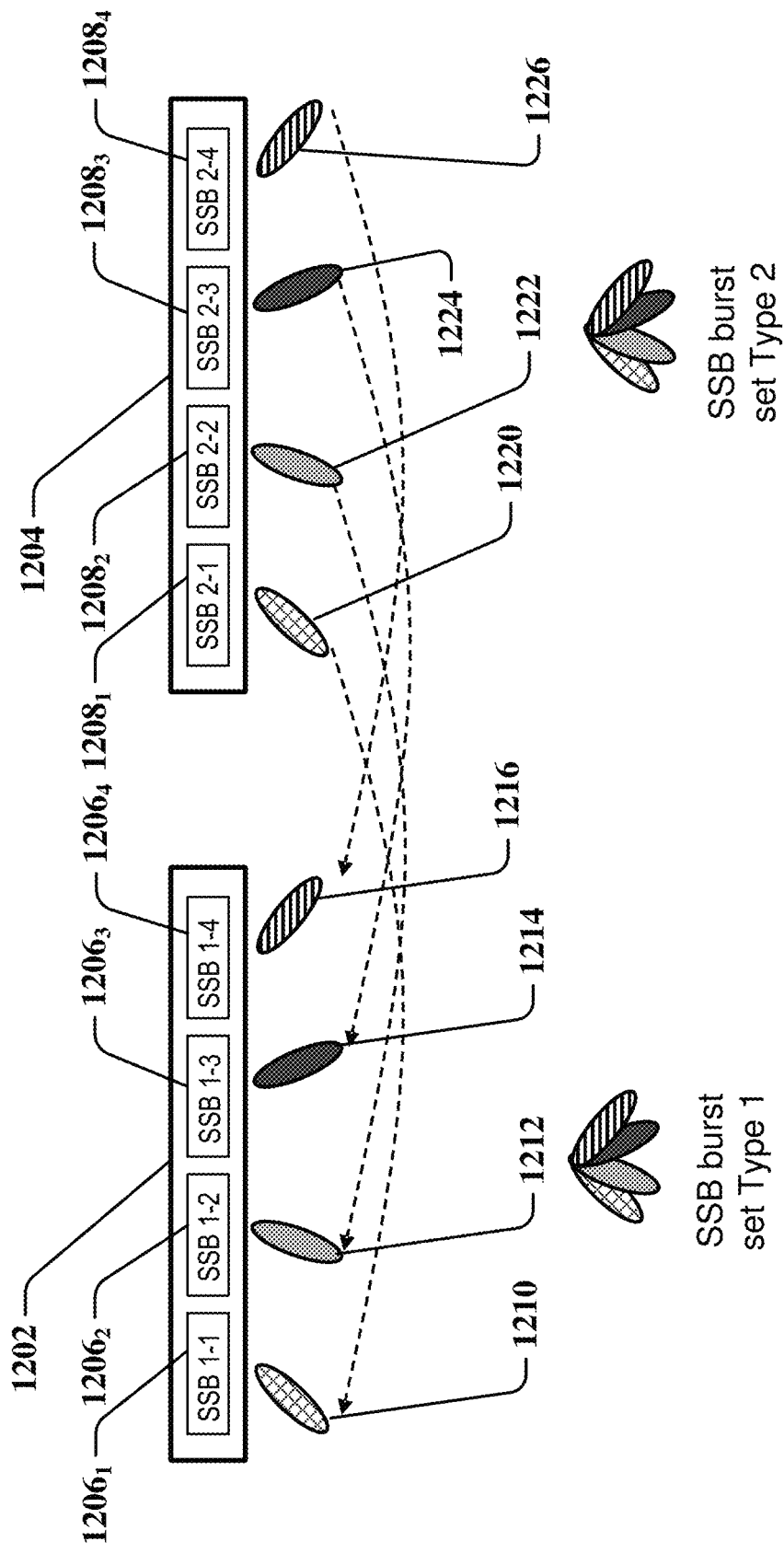
FIG. 12 illustrates a diagram of exemplary SSB burst sets having quasi co-located beams according to some aspects.

Turning to FIG. 12, an example of the quasi co-location of transmit beams for SSBs from one SSB burst set and transmit beams for SSBs from another SSB burst set is illustrated. In the example of FIG. 12, the number of SSBs in a first type of burst set 1202 will match the number of SSBs in a second type of burst set 1204 and each SSB in one set will be QCLed with a corresponding SSB in the other set. Generally stated, a $k^{th}$ SSB in an SSB burst set Type 1 (e.g., 1202) is QCLed with the corresponding $k^{th}$ SSB in an SSB burst set Type 2 (e.g., 1204). In the illustrated example, a first SSB 1206$_1$ of first SSB burst set 1202 is QCLed with a corresponding first SSB 1208$_1$ of second SSB burst set 1204. This quasi co-location of the SSB 1206$_1$ and SSB 1208$_1$ is further illustrated by transmit beam 1210 for first SSB 1206$_1$ from the first SSB burst set 1202 that is the same (e.g., in size and direction) as a transmit beam 1220 for first SSB 1208$_1$ from the second SSB burst set 1204. Similarly, a second SSB 1206$_2$ of first SSB burst set 1202 is QCLed with a corresponding second SSB 1208$_2$ of second SSB burst set 1204, and so forth. The transmit beam for each pair of corresponding SSBs between the two types of SSB burst sets 1202 and 1204 are the same as may be seen by transmits beams 1212 and 1222, 1214 and 1224, or 1216 and 1226.

In the illustrated example of FIG. 12, while the total number of SSBs per set is four, it is to be appreciated that the disclosure is not limited to such and that the methodology is applicable to any two SSB burst sets both having the same k number of SSBs. Further, it is noted that the present methodology may be applicable to mismatched numbers of SSBs in the respective SSB burst sets. For example, the number of SSBs in an SSB burst set Type 2, for example, may be twice the number of SSBs in SSB burst set Type 1. In this example, the SSB burst set Type 2 will have twice as many transmit beams, but it may be possible to quasi co-locate multiple numbers of beams associated with the SSB burst set Type 2 with a single beam associated with a transmit beam for an SSB in SSB burst set Type 1 as illustrated in FIG. 13.

Figure 13:
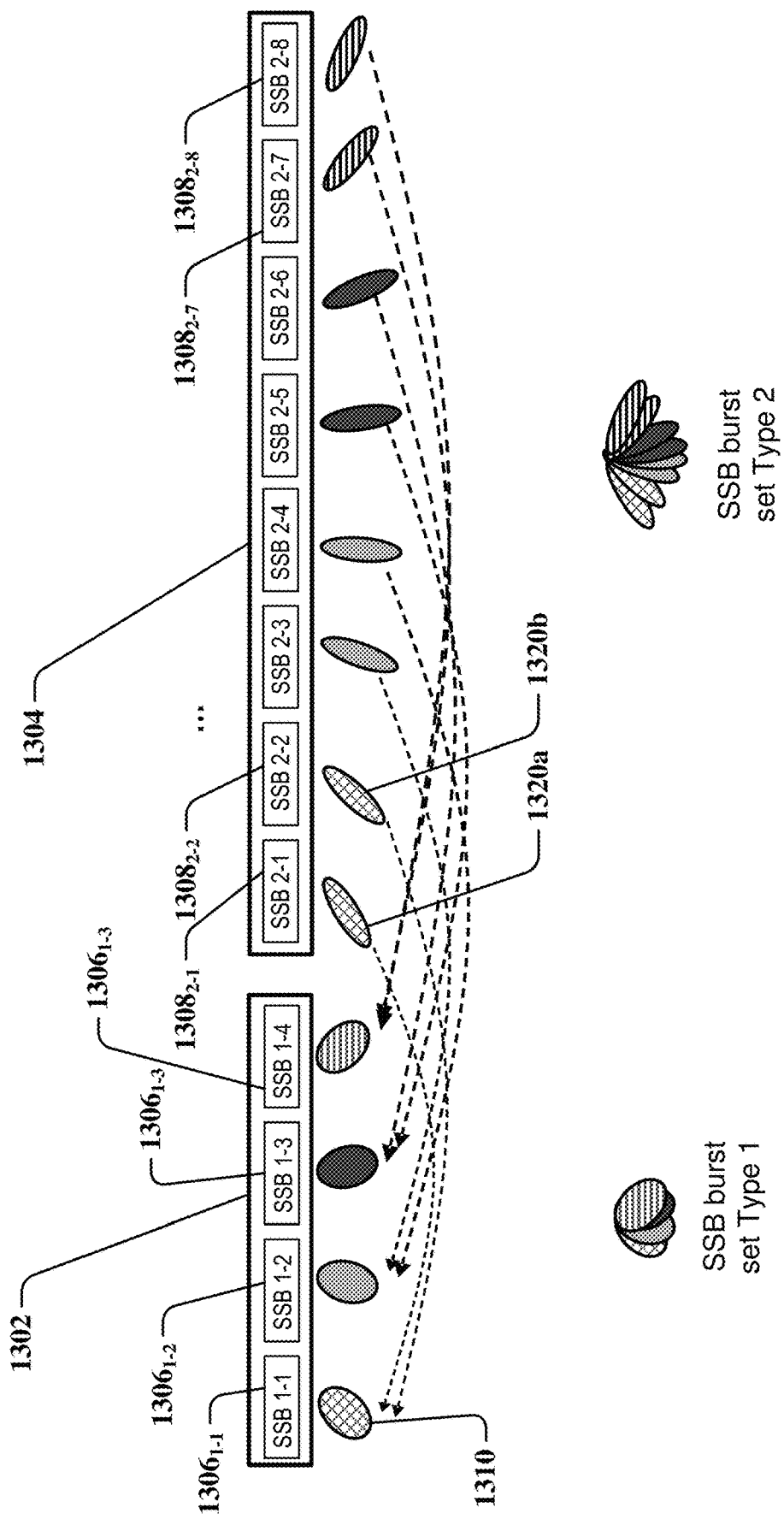
FIG. 13 illustrates a diagram of exemplary SSB burst sets having quasi co-located beams according to some aspects.

FIG. 13 illustrates an example of the quasi co-location of multiple beams for SSBs from one SSB burst set and with a corresponding beam for an SSB from another SSB burst set. In this particular example, the number of SSBs 1306 in a first type (Type 1) of SSB burst set 1302 is half of the number of SSBs 1308 in a second type (Type 2) of SSB burst set 1304. Further, in this example a transmit beam 1310 for an SSB from the first SSB burst set 1304 (i.e., a first SSB 1306$_{1\text{-}1}$) is QCLed with two beams 1320a and 1320b, each respectively associated with a first SSB 1308$_{2\text{-}1}$ and a second SSB 1308$_{2\text{-}2}$ in the SSB burst set 1304. In general for the situation where one set has twice as many SSBs as the other set, the QCLing of beams follows the relationship where the $(2k-1)^{th}$ SSB and the $2k^{th}$ SSB in the larger SSB burst set (e.g., SSB burst set Type 2 1304) is QCLed with the $k^{th}$ SSB in the smaller SSB burst set (e.g., SSB burst set Type 1 1302). It is noted that the 2:1 SSB ratio illustrated is merely exemplary and other associations could be contemplated such as 3 beams of an SSB burst set to 1 beam of the other SSB burst set, and so forth.

Of further note in the example of FIG. 13, the transmit beam width for SSBs in the smaller set (e.g., SSB burst set Type 1 1302) is twice the width as the transmit beams of the larger SSB burst set (e.g., SSB burst set Type 2 1304). This may be seen, for example, in that beam 1310 associated with beams 1320a and 1230b is configured to be twice the size of these beams 1320a and 1320b. Of further note, the directions or angles of beams 1320a and 1320b in this example are slightly different for different cell coverage, but collectively may still fall within the beam width of beam 1310 such that detection of one of the SSBs (e.g., 1306$_{1\text{-}1}$) may allow a UE to locate at least one of the associated SSBs in the other set (e.g., first SSB 1308$_{2\text{-}1}$ or second SSB 1308$_{2\text{-}2}$ in the SSB burst set 1304). Again, the present disclosure is not limited to the particular numbers of SSBs or beam widths illustrated in the example of FIG. 13 for the 2:1 ratio, and the beam width of an SSB in one SSB burst set could be sized to accommodate an association (i.e., QCL) with 3 or more beams from SSBs in the other SSB burst set.

Figure 14:
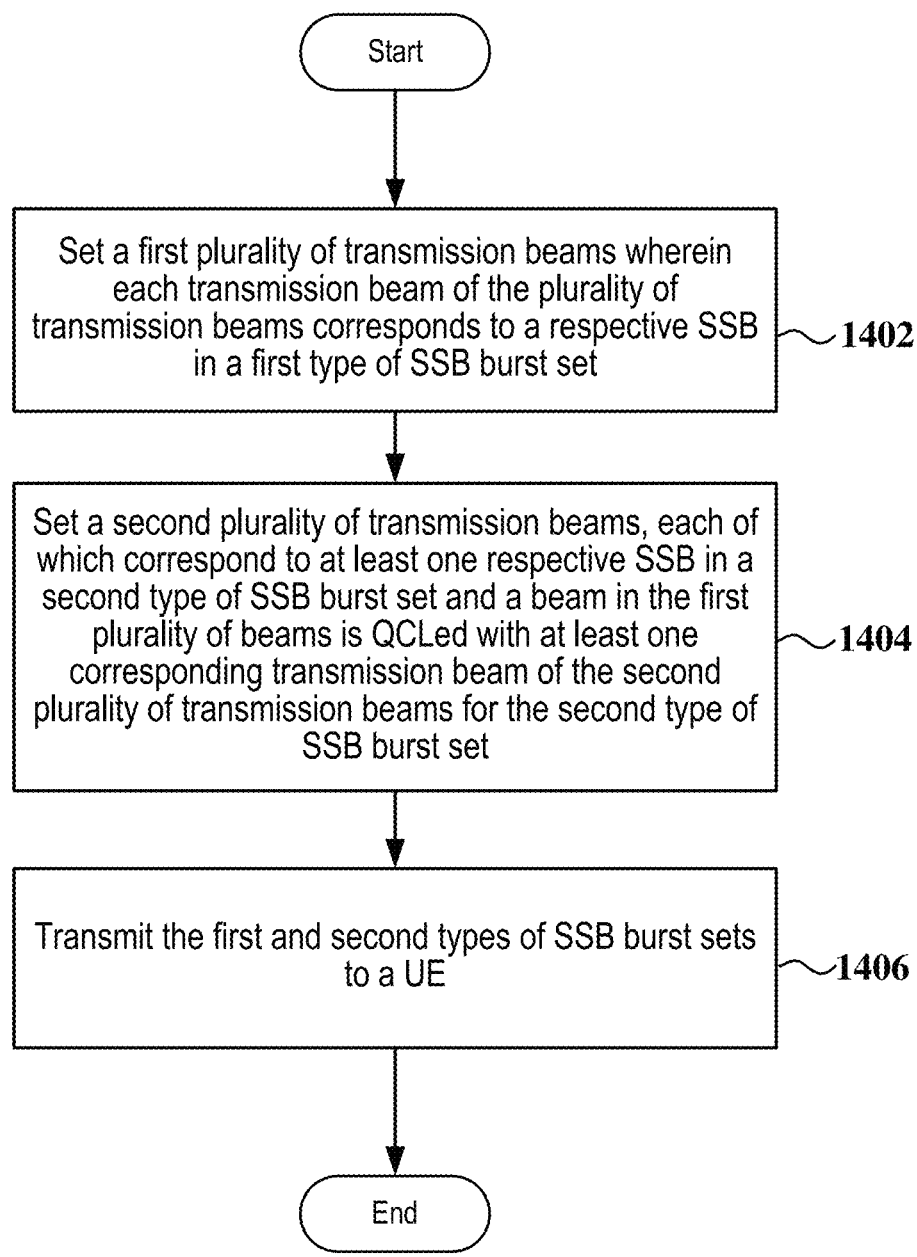
FIG. 14 is a flow chart of another exemplary method of wireless communication at a base station according to some aspects.

FIG. 14 is a flow chart of another exemplary method 1400 of wireless communication according to certain aspects. According to some examples, method 1400 may be implemented in a base station or gNB, such as base station 110 in FIG. 1 or RAN entity or base station 1600 to be discussed later, or some other scheduling entity. As shown at block 1402, method 1400 includes setting a first plurality of transmission beams in a base station wherein each transmission beam of the plurality of transmission beams corresponds to a respective synchronization signal block (SSB) in a first type of SSB burst set. Further, method 1400 includes setting a second plurality of transmission beams, each of which correspond to at least one respective SSB in a second type of SSB burst set and wherein a transmission beam in the first plurality of transmission beams for the first type of SSB burst set is quasi co-located (QCLed) with at least one corresponding transmission beam of the second plurality of transmission beams for the second type of SSB burst set as shown at block 1404. Yet further, method 1400 includes transmitting the first and second types of SSB burst sets to a UE as shown at block 1406.

In some aspects, method 1400 includes the transmission beam and the at least one corresponding transmission beam have a same width, such as was shown in the example of FIG. 12. Additionally, the number of SSBs in the first type of SSB burst set may be equal to the number of SSBs in the second type of SSB burst set as also shown in FIG. 12.

In other aspects, method 1400 may include setting the second plurality of transmission beams further includes quasi co-locating two or more transmission beams of the second plurality of transmission beams for the second type of SSB burst set with a single transmission beam in the first plurality of transmission beams for the first type of SSB burst set when a number of SSBs in the second type of SSB burst set is equal to a multiple number (e.g., 2) of a number of SSBs in the first type of SSB burst set, as was discussed in connection with FIG. 13 above. Additionally, method 1400 may include that the width of the single transmission beam in the first plurality of transmission beams is at least the multiple number (e.g., 2) of the width of the transmission beams in the second plurality of transmission beams as also discussed in connection with FIG. 13 above.

Figure 15:
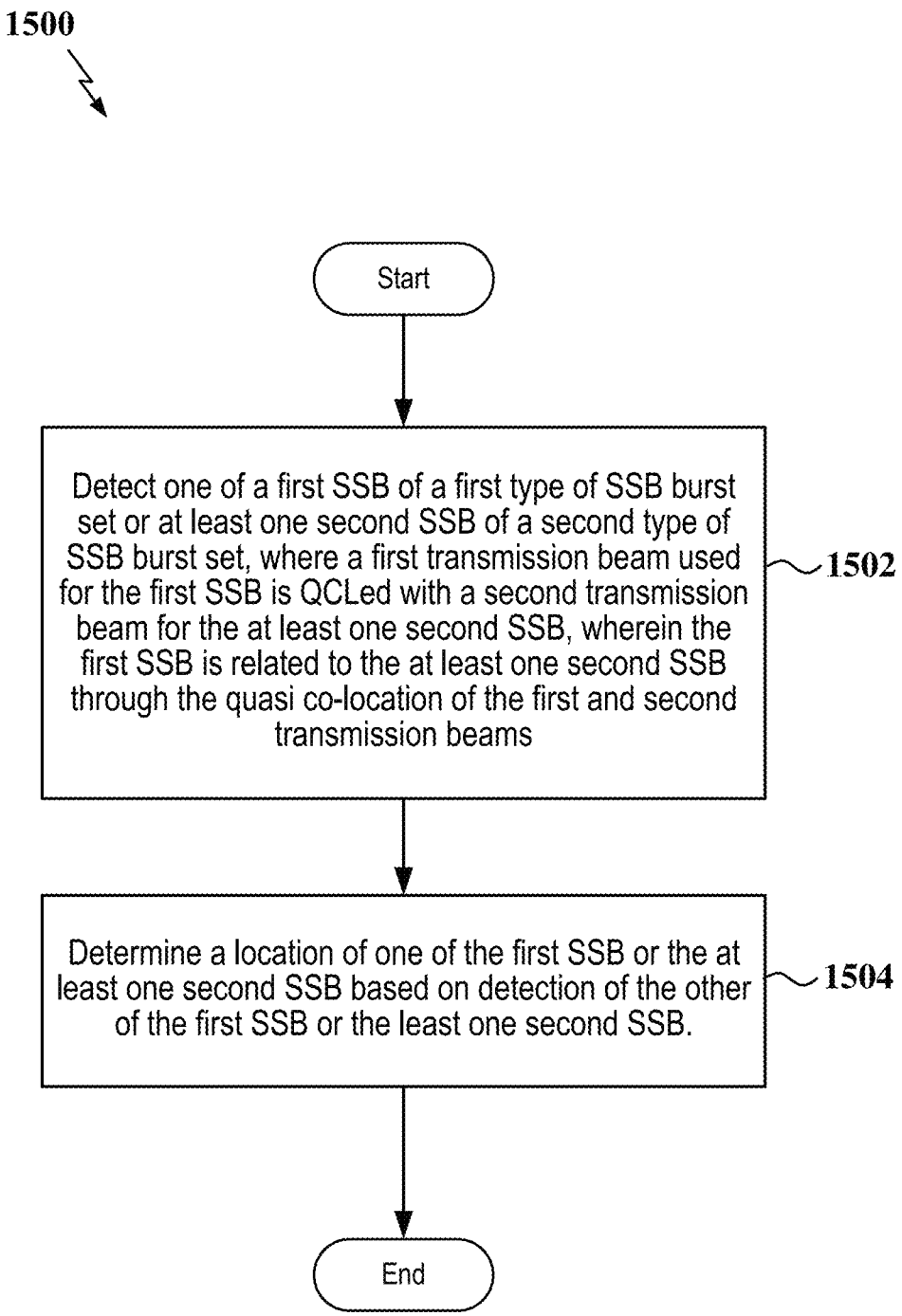
FIG. 15 is a flow chart of another exemplary method of wireless communication at a UE according to some aspects.

FIG. 15 is a flow chart of another exemplary method 1500 of wireless communication according to certain aspects. According to some examples, method 1500 may be implemented in a UE or other scheduled entities, such as UEs 122, 126, 130 in FIG. 1 or UE 1700 to be discussed later. Method 1500 includes detecting, in a user equipment (UE), one of a first synchronization signal block (SSB) of a first type of SSB burst set or at least one second SSB of a second type of SSB burst set, wherein a first transmission beam used for the first SSB is quasi co-located (QCLed) with a second transmission beam for the at least one second SSB, and wherein the first SSB is related to the at least one second SSB through the quasi co-location of the first and second transmission beams as shown at block 1502. Additionally, method 1500 includes determining a location of one of the first SSB or the at least one second SSB based on detection of the other of the first SSB or the least one second SSB as shown in block 1504. According to other aspects, method 1500 may include determining the location of the at least second SSB based on detection of the first SSB transmitted on the first transmission, wherein the determination is based on a plurality of second transmission beams where each second transmission beam corresponds to a respective second SSB in the second type of SSB burst set and the plurality of second transmission beams are quasi co-located with the first transmission beam when a number of SSBs in the second type of SSB burst set is equal to a multiple number of a number of SSBs in the first type of SSB burst set.

Figure 16:
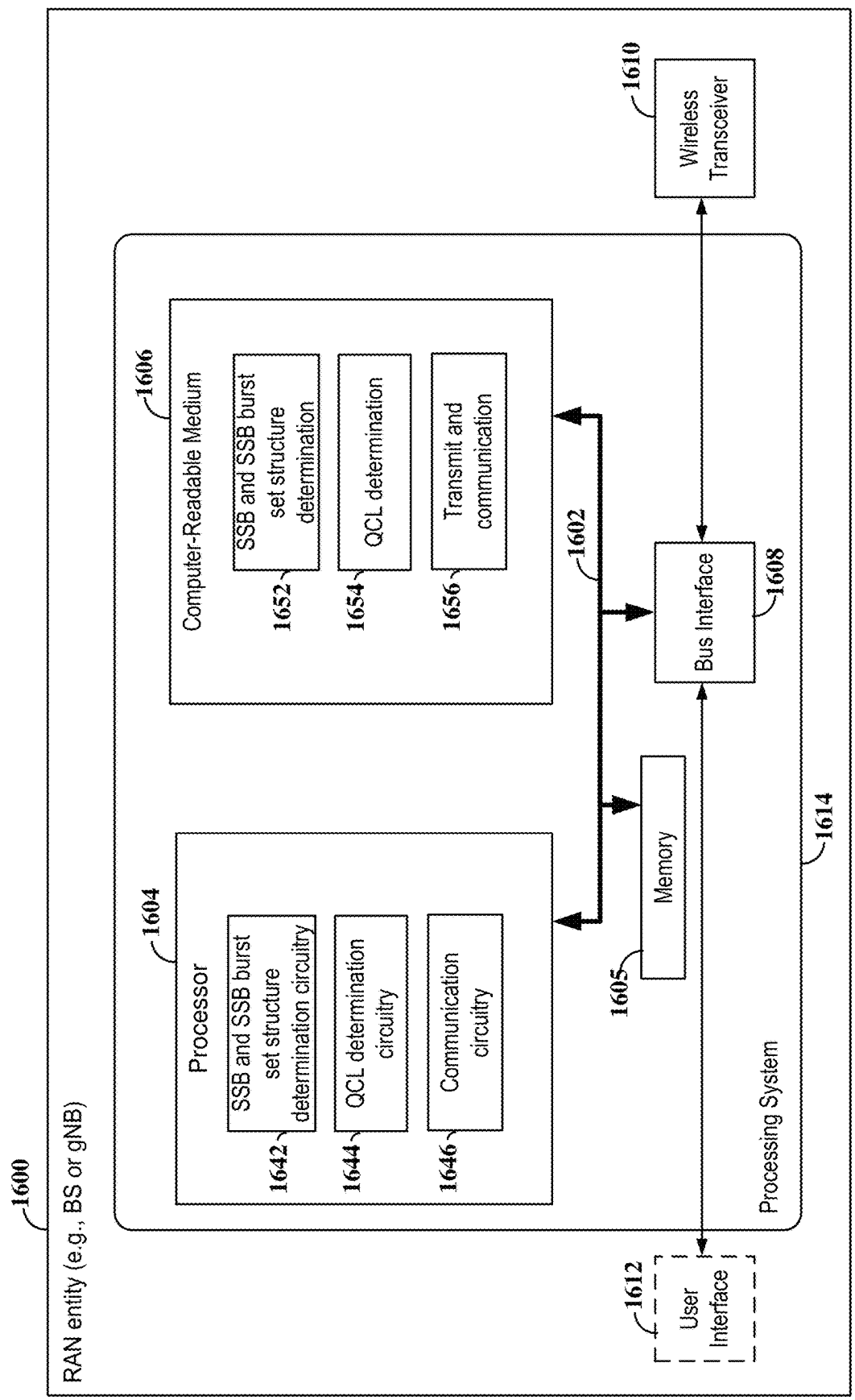
FIG. 16 is a diagram illustrating an example of a hardware implementation for a RAN entity, such as a base station, employing a processing system according to some aspects.

FIG. 16 is a block diagram illustrating an example of a hardware implementation for a radio access network (RAN) entity 1600 employing a processing system 1614. For example, the RAN entity 1600 may correspond to a base station or gNB such as those shown and described above in reference to FIG. 1.

The RAN entity 1600 may be implemented with processing system 1614 including one or more processors 1604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN entity 1600 may be configured to perform any one or more of the functions described herein. That is, the processor 1604, as utilized in the RAN entity 1600, may be used to implement any one or more of the processes and procedures described herein including the processes of FIGS. 4-8, 10, and 12-14, as well as the processes of FIG. 17, to be discussed below, as examples.

In this example, the processing system 1614 may be implemented with a bus architecture, represented generally by the bus 1602. The bus 1602 may include any number of interconnecting buses and bridges depending on the specific application of the processing system 1614 and the overall design constraints. The bus 1602 links together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further.

A bus interface 1608 provides an interface between the bus 1602 and a wireless transceiver 1610. The wireless transceiver 1610 provides a means for communicating with various other apparatus over a transmission medium (e.g., air interface). Depending upon the nature of the apparatus, a user interface 1612 (e.g., keypad, display, touch screen, speaker, microphone, control knobs, etc.) may also be provided. Of course, such a user interface 1612 is optional, and may be omitted in some examples.

The processor 1604 is responsible for managing the bus 1602 and general processing, including the execution of software stored on the computer-readable medium 1606. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. In some examples, the computer-readable medium 1606 may be part of the memory 1605. Those skilled in the art will recognize how best to implement the described functionality presented throughout this disclosure depending on the particular application and the overall design constraints imposed on the overall system.

In some aspects of the disclosure, the processor 1604 may include circuitry configured for various functions. For example, the processor 1604 may include SSB and SSB burst set structure determination or configuration circuitry 1642, configured to determine various SSB structures and SSB burst sets, the SSB parameters (e.g., SCS), the different types of SSB burst sets, as well as relationships between the SSB burst sets, such as was discussed in connection with FIGS. 3-8, 10, and 12-14 and also to be discussed in connection with FIG. 17. The SSB and SSB burst set structure determination circuitry 1642 may further be configured to execute SBB and SSB burst set structure determination instructions or software 1652 stored on the computer-readable medium 1606 to implement one or more functions described herein.

The processor 1604 may further include a quasi co-location (QCL) determination circuitry 1644 that is configured for determining and setting QCL correlations between transmit beams of one SSB burst set and another SSB burst set as was discussed above in connection with FIGS. 12-14, for example. Furthermore, QCL determination circuitry 1644 may work in conjunction with circuitry 1642 for correlating particular beam patterns with particular SSBs within the determined SSB burst sets. The QCL determination circuitry 1644 may further be configured to execute QCL determination instructions or software 1654 stored on the computer-readable medium 1606 to implement one or more functions described herein.

In other aspects, the processor 1604 may further include communication circuitry 1646, which is configured to effectuate SSB transmission in conjunction with other circuitry and wireless transceiver 1610. In aspects, the communication circuitry 1646 may be configured to cause RRC signaling to another device such as UE to communicate various information concerning SSB configurations and relationships as discussed herein. The communication circuitry 1646 may further be configured to execute communication circuitry instructions or software 1656 stored on the computer-readable medium 1606 to implement one or more functions described herein.

Figure 17:
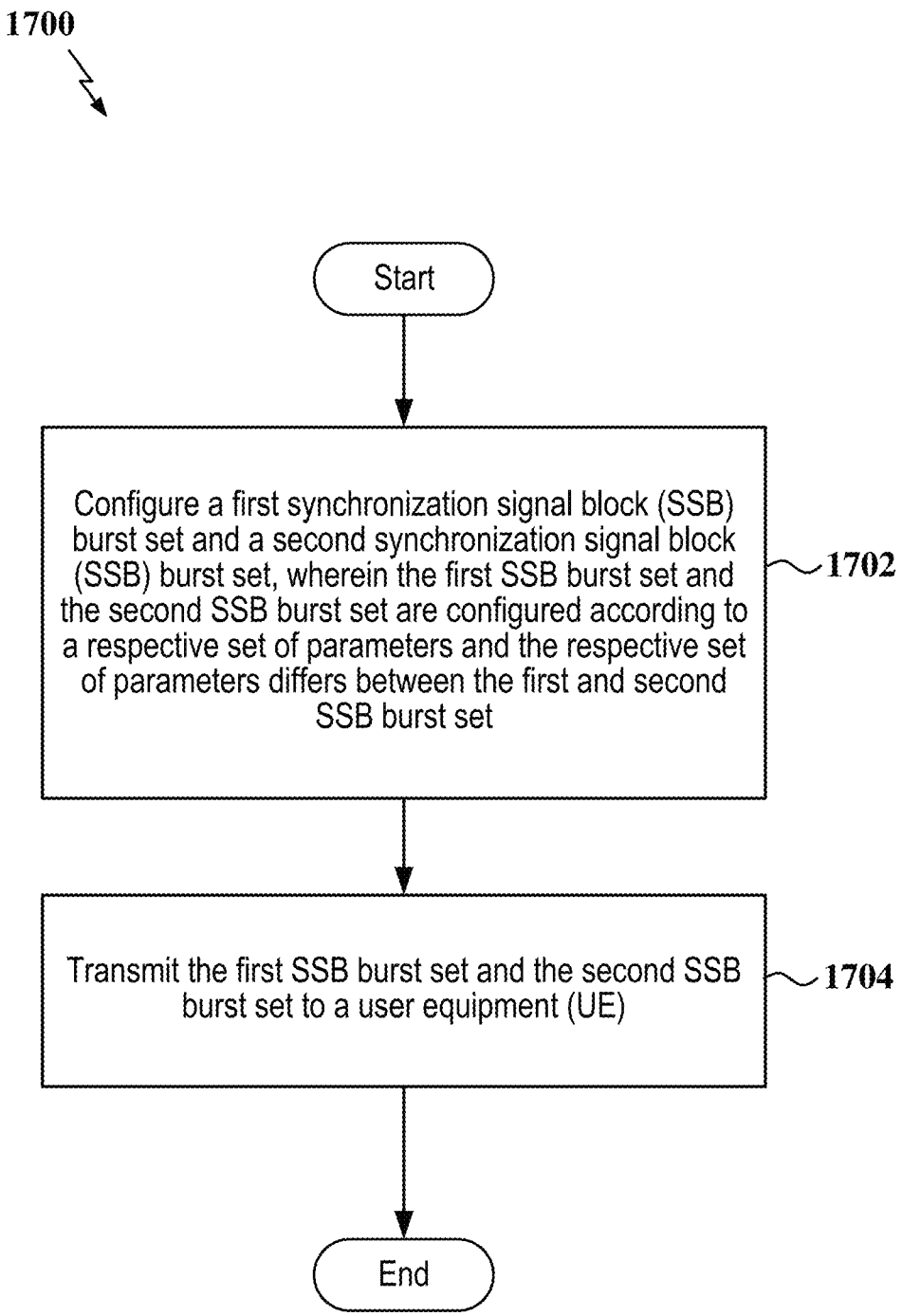
FIG. 17 is a flow chart of yet another exemplary method of wireless communication at a base station according to some aspects.

FIG. 17 illustrates a flow diagram of an exemplary method 1700 for generating SSBs and SSB burst sets in a base station or gNB, according to some aspects. Some or all illustrated features may be omitted in a particular implementation within the scope of the present disclosure, and some illustrated features may not be required for implementation of all aspects. In some examples, the method 1700 may be performed by the RAN entity or base station 1600 as described above and illustrated in FIG. 16, by any other base stations or gNBs illustrated herein including 110, 112, 113, or 114 and 116, by a processor or processing system, or by any suitable means for carrying out the described functions.

At block 1702, method 1700 includes configuring a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set. In an example, the configuring of the first and second SSB burst sets (and individual SSBs therein) may include the utilization of the SSB and SSB burst set structure determination circuit 1642 shown and described above in connection with FIG. 16 to provide a means to determine the first and second SSB bursts. In yet further aspects, the SSB and SSB burst set structure determination circuit 1642 may provide means for configuring each SSB in at least one of the first or second SSB burst sets to selectively include one or more of a primary synchronization signal (PSS), a secondary synchronization signal (SSS), and a physical broadcast channel (PBCH) in each SSB without the constraint that the SSB include all of the PSS, SSS, and PBCH, such as was illustrated in connection with the various examples of FIGS. 5A-F. Still further, the SSB and SSB burst set structure determination circuit 1642 may provide means determining or setting respective parameters for each of the first and/or second SSBs or SSB burst sets including at least one of a period of transmission of SSBs within the first or second SSB burst set, a number of SSBs within the first or second SSB burst set, and a subcarrier spacing (SCS) for SSBs within the first or second SSB burst set.

At block 1704, method 1700 includes transmitting the first and second SSB burst sets from the base station to a user equipment (UE). In an aspect, the communication circuit 1646 described above in connection with FIG. 16 may provide a means for transmitting the first and second determined SSB burst sets. This means may also include transceiver 1610 in communication with the SSB and SSB burst set structure determination circuit 1642 and/or the transmit and communication circuit 1646.

In further aspects, method 1700 may include configuring the first SSB burst set with a first SCS and the second SSB burst set with a second SCS that is different from the first SCS, such as a greater SCS in some examples. In an example, the determination of the SCS configurations may include the utilization of the SSB and SSB burst set structure determination circuit 1642 shown and described above in connection with FIG. 16 to provide a means to determine the first and second SSB bursts. In yet further examples, method 1700 may include generating at least one SSB in the first SSB burst set to include resource allocation information for the second SSB burst set, and transmitting the determined first SSB burst set from the base station to the UE as was discussed above in connection with FIG. 7. In a further example, the determination resource allocation may include the utilization of the SSB and SSB burst set structure determination circuit 1642 shown and described above in connection with FIG. 16 to provide a means to determine the resource allocation information as well as configure at least one SSB in a first SSB burst set to include the resource allocation information.

In yet further examples, method 1700 may include configuring at least one SSB in the first SSB burst set to indicate a first physical-layer cell identity (PCID) that is configured to have a predetermined relationship with a second PCID used with the second SSB burst set utilized in the wireless communication network such that a user equipment (UE) may identify the second PCID based on the first PCID, such as was discussed in connection with FIG. 10 above. In an example, configuring at least one SSB in the first SSB burst set to indicate a first physical-layer cell identity (PCID) may utilize the SSB and SSB burst set structure determination circuit 1642 shown and described above in connection with FIG. 16 to provide a means for configuring at least one SSB in a first SSB burst set to indicate a PCID to a UE. Yet further, method 1700 may include the predetermined relationship comprising the second PCID being equal to a function of first PCID. Furthermore, the function of the first PCID may include the second PCID being equal to mod (the first PCID+N, M), where mod represents a modulo operation, N is a predetermined integer number, and M is a maximum number of possible PCIDs in the wireless communication network.

In yet another example, method 1700 may include generating a first plurality of transmission beams, each of which corresponds to a respective SSB in the first SSB burst set, and generating a second plurality of transmission beams, each of which corresponds to a respective SSB in the second SSB burst set, wherein a transmission beam in the first plurality of transmission beams for the first SSB burst set is quasi co-located (QCLed) with at least one corresponding transmission beam of the second plurality of transmission beams for the second SSB burst set. In an example, the determination of the QCLing of the first and second plurality of transmission beams may utilize the QCL determination circuit 1644 shown and described above in connection with FIG. 16 to provide a means for QCL the first and second SSB burst sets, such as was discussed above in connection with FIGS. 12 and 13, as examples.

Figure 18:
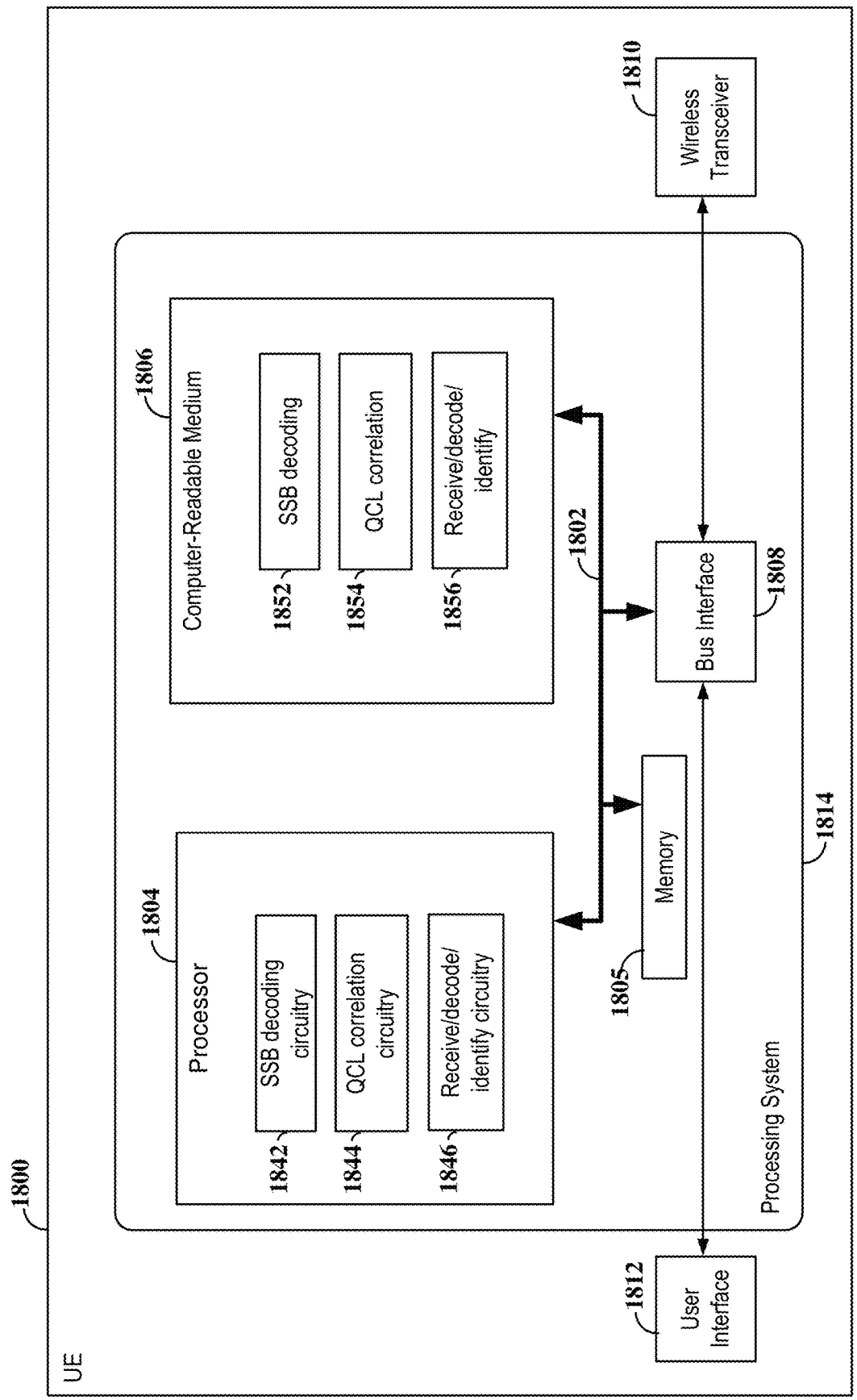
FIG. 18 is a diagram illustrating another example of a hardware implementation for a UE employing a processing system according to some aspects.

FIG. 18 is a conceptual diagram illustrating an example of a hardware implementation for an exemplary wireless communication device or UE 1800 employing a processing system 1814. In examples, the UE 1800 may be a UE or similar device as illustrated in FIG. 1, for example. The UE 1800 may be implemented with a processing system 1814 that includes one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1800 may be configured to perform any one or more of the functions described herein. That is, the processor 1804, as utilized in UE 1800, may be used to implement any one or more of the processes described below. The processor 1804 may in some instances be implemented via a baseband or modem chip and in other implementations, the processor 1804 may itself comprise a number of devices distinct and different from a baseband or modem chip (e.g., in such scenarios is may work in concert to achieve examples discussed herein). As mentioned above, various hardware arrangements and components outside of a baseband modem processor can be used in implementations, including RF-chains, power amplifiers, modulators, buffers, interleavers, adders/summers, etc.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802 and a transceiver 1810. The transceiver 1810 provides a means for communicating with various other apparatus over a transmission medium (e.g., air interface). A user interface 1812 (e.g., keypad, touch screen, display, speaker, microphone, joystick, etc.) may also be provided.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. In some examples, the computer-readable medium 1806 may be part of the memory 1805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1804 may include circuitry configured for various functions. For example, the processor 1804 may include SSB decoding circuitry 1842, which is configured to decode the various received SSBs such as for cell search and acquisition procedures as disclosed above in connection with FIGS. 3-5, 9, 11, and 15, as well as FIG. 19 to be described later. The SSB decoding circuitry 1842 may further be configured to execute SSB decoding instructions or software 1852 stored on the computer-readable medium 1806 to implement one or more functions described herein.

In further aspects, the processor 1804 may include QCL correlation circuitry 1844 configured to perform correlation of QCLed transmission beams to determine locations of an SSB of one burst set based on detected/decoded/identified SSBs from another set having the same transmit beam as was discussed above in connection with FIGS. 12, 13, and 15. The QCL correlation circuitry 1844 may further be configured to execute QCL correlation instructions or software 1854 stored on the computer-readable medium 1806 to implement one or more functions described herein.

In still further aspects, the processor 1804 may include receive, decode, and/or identify circuitry 1846, which may be configured to perform initial detection, decoding or identification of received SSBs and may operate in conjunction with transceiver 1810. Additionally, circuitry 1846 may interface or communication with SSB decoding circuitry and QCL correlation circuitry 1844 for decoding the SSBs including relationships between co-located SSBs, included resource allocation information, or determining PCIDs of one SSB based on a predetermined relationship with an SSB from another SSB burst set as was discussed above in connection with FIGS. 3-5, 9, 11, and 15. The receive, decode, and/or identify circuitry 1846 may further be configured to execute receive, decode, and/or identify instructions or software 1856 stored on the computer-readable medium 1806 to implement one or more functions described herein.

Figure 19:
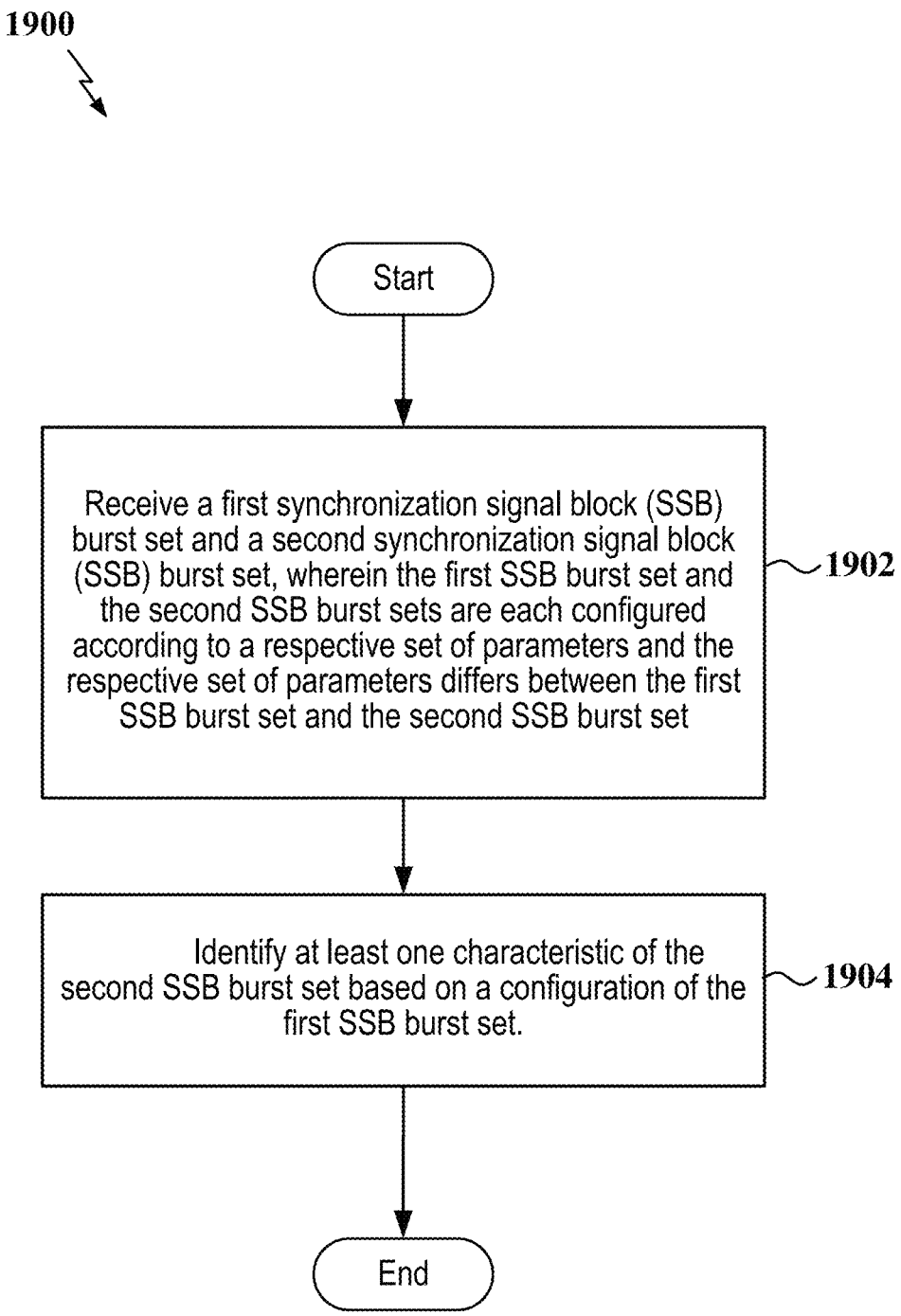
FIG. 19 is a flow chart of still another exemplary method of wireless communication at a UE according to some aspects.

FIG. 19 illustrates a flow diagram of an exemplary method 1900 for receiving SSBs and SSB burst sets in a UE, according to some aspects. Some or all illustrated features may be omitted in a particular implementation within the scope of the present disclosure, and some illustrated features may not be required for implementation of all aspects. In some examples, the method 1900 may be performed by the UE 1800 as described above and illustrated in FIG. 18, by any other UEs or wireless devices illustrated herein including 122, 124, 126, 128, 130, 132, 134, 138, 140, 144, 146, or 148 shown in FIG. 1, by a processor or processing system, or by any suitable means for carrying out the described functions.

At block 1902, method 1900 includes receiving a first synchronization signal block (SSB) burst set and a second synchronization signal block (SSB) burst set, wherein the first SSB burst set and the second SSB burst sets are each configured according to a respective set of parameters and the respective set of parameters differs between the first SSB burst set and the second SSB burst set. In an aspect, the different parameters may include different SCSs, SSB burst set locations within the time/frequency allocated resources, or different periods of transmission between the first and second SSB sets, as examples. Moreover, receive/decode/identify circuit 1846 along with wireless transceiver 1810 may provide means for receiving the first and second SSB sets.

Additionally, method 1900 includes identifying at least one characteristic of the second SSB burst set based on a configuration of the first SSB burst set. In some aspects, the SSB decoding circuit 1842 may provide means determining and/or decoding the parameters from one SSB burst set to determine aspects or the at least one characteristic of another SSB burst set (i.e., at least the second SSB burst set), such as location, SCS, periodicity, etc.

Several aspects of a wireless communication network have been presented with reference to an exemplary implementation. As those skilled in the art will readily appreciate, various aspects described throughout this disclosure may be extended to other telecommunication systems, network architectures and communication standards.

The following provides an overview of aspects of the present disclosure:

Aspect 1: A method of wireless communication at a base station in a wireless communication network, the method comprising: configuring a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set; and transmitting the first SSB burst set and the second SSB burst set to a user equipment (UE).

Aspect 2: The method of aspect 1, wherein each SSB in at least one of the first SSB burst set or the second SSB burst set is configured to selectively include one or more of a primary synchronization signal (PSS), a secondary synchronization signal (SSS), or a physical broadcast channel (PBCH).

Aspect 3: The method of aspect 1 or aspect 2, wherein the configuring the first SSB burst set and the second SSB burst set further comprises configuring the respective set of parameters for each of the first SSB set and the second SSB burst set, wherein each of the respective set of parameters comprises at least one of a period of transmission of SSBs, a number of the SSBs, or a subcarrier spacing (SCS) for the SSBs.

Aspect 4: The method of any one of aspects 1 through 3, further comprising configuring the first SSB burst set with a first SCS and the second SSB burst set with a second SCS that is different from the first SCS.

Aspect 5: The method of any one of aspects 1 through 4, further comprising: generating at least one SSB in the first SSB burst set to include resource allocation information for the second SSB burst set; and transmitting the first SSB burst set including the at least one SSB.

Aspect 6: The method of aspect 5, wherein the resource allocation information comprises one or more of locations of SSBs in the second SSB burst set, a period of transmission of the SSBs within the second SSB burst set, or a subcarrier spacing (SCS) of the SSBs within the second SSB burst set.

Aspect 7: The method of any one of aspects 1 through 6, wherein the first SSB burst set is configured with a first SCS and the second SSB burst set is configured with a second SCS that is different from the first SCS.

Aspect 8: The method of any one of aspects 1 through 7, further comprising: configuring at least one SSB in the first SSB burst set to indicate a first physical-layer cell identity (PCID) that is configured to have a predetermined relationship with a second PCID used with the second SSB burst set.

Aspect 9: The method of aspect 8, wherein the predetermined relationship comprises the second PCID being equal to a function of the first PCID.

Aspect 10: The method of any one of aspects 8 or 9, wherein the function of the first PCID comprises the second PCID being equal to mod (the first PCID+N, M), where mod represents a modulo operation, N is a predetermined integer number, and M is a maximum number of possible PCIDs in the wireless communication network.

Aspect 11: The method of any one of aspects 1 through 10, further comprising: transmitting radio resource control (RRC) signaling to the UE for communicating the predetermined relationship.

Aspect 12: The method of any one of aspects 1 through 11, further comprising: generating a first plurality of transmission beams, each of which corresponds to a respective SSB in the first SSB burst set; and generating a second plurality of transmission beams, each of which corresponds to a respective SSB in the second SSB burst set, wherein a transmission beam in the first plurality of transmission beams for the first SSB burst set is quasi co-located (QCLed) with at least one corresponding transmission beam of the second plurality of transmission beams for the second SSB burst set.

Aspect 13: The method of aspect 12, wherein QCLed transmission beams in the first and second plurality of transmission beams have a same beam width.

Aspect 14: The method of aspects 12 or 13, wherein the generating the second plurality of transmission beams further comprises: quasi co-locating two or more transmission beams of the second plurality of transmission beams for the second SSB burst set with a single transmission beam in the first plurality of transmission beams for the first SSB burst set based on a number of SSBs in the second SSB burst set being equal to a multiple number of a number of SSBs in the first SSB burst set.

Aspect 15: The method of aspects 12 or 14, wherein a first width of a first transmission beam in the first plurality of transmission beams is at least twice a second width of a second transmission beam in the second plurality of transmission beams.

Aspect 16: A method of wireless communication at a user equipment (UE) in a wireless communication network, the method comprising: receiving a first synchronization signal block (SSB) burst set and a second synchronization signal block (SSB) burst set, wherein the first SSB burst set and the second SSB burst sets are each configured according to a respective set of parameters and the respective set of parameters differs between the first SSB burst set and the second SSB burst set; and identifying at least one characteristic of the second SSB burst set based on a configuration of the first SSB burst set.

Aspect 17: The method of aspect 16, wherein the first SSB burst set is configured with a first subcarrier spacing (SCS) and the second SSB burst set is configured with a second SCS that is different from the first SCS.

Aspect 18: The method of any one of aspects 16 or 17, wherein the first SSB burst set comprises at least one SSB comprising resource allocation information concerning at least the second SSB burst set; and wherein the identifying further comprises: identifying the at least one characteristic of the second SSB burst set based on the resource allocation information.

Aspect 19: The method of any one of aspects 16 through 18, wherein the at least one characteristic comprises a location of the second SSB burst set in wireless resources.

Aspect 20: The method of any one of aspects 18 or 19, wherein the resource allocation information comprises one or more of locations of SSBs in the second SSB burst set, a period of transmission of the SSBs within the second SSB burst set, or a subcarrier spacing (SCS) of the SSBs within the second SSB burst set.

Aspect 21: The method of any one of aspects 16 through 20, wherein the first SSB burst set comprises at least one SSB comprising a first physical-layer cell identity (PCID) that is configured to have a predetermined relationship with a second PCID used with the second SSB burst set, and wherein the identifying further comprises: identifying the at least one characteristic based on the first PCID, wherein the at least one characteristic is the second PCID determined based on the first PCID.

Aspect 22: The method of any one of aspects 16 through 18, wherein the predetermined relationship comprises the second PCID being equal to a function of the first PCID.

Aspect 23: The method of aspect 22, wherein the function of the first PCID comprises the second PCID being equal to mod (the first PCID+N, M), where mod represents a modulo operation, N is a predetermined integer number, and M is a maximum number of possible PCIDs in the wireless communication network.

Aspect 24: The method of any one of aspects 16 through 23, further comprising: receiving radio resource control (RRC) signaling that communicates the predetermined relationship for determining the second PCID.

Aspect 25: The method of any one of aspects 16 through 24, further comprising: receiving a first plurality of transmission beams, each of which corresponds to a respective SSB in the first SSB burst set; and receiving a second plurality of transmission beams, each of which corresponds to a respective SSB in the second SSB burst set, wherein a transmission beam in the first plurality of transmission beams for the first SSB burst set is quasi co-located (QCLed) with at least one corresponding transmission beam of the second plurality of transmission beams for the second SSB burst set; wherein the at least one characteristic of the second SSB burst set may be determined based on QCLed transmission beams in the first and second SSB burst sets.

Aspect 26: The method of aspect 25, wherein the QCLed transmission beams in the first and second plurality of transmission beams have a same beam width.

Aspect 27: The method of aspects 25 or 26, wherein the second plurality of transmission beams further comprises two or more transmission beams of the second plurality of transmission beams for the second SSB burst set quasi co-located with a single transmission beam in the first plurality of transmission beams for the first SSB burst set based on a number of SSBs in the second SSB burst set being equal to a multiple number of a number of SSBs in the first type of SSB burst set.

Aspect 28: The method of aspects 25 or 27, wherein a first width of a first transmission beam in the first plurality of transmission beams is at least twice a second width of a second transmission in the second plurality of transmission beams.

Aspect 29: A base station configured for wireless communication, comprising: a processor; a transceiver communicatively coupled to the processor; and a memory communicatively coupled to the processor, wherein the processor and the memory are configured to: configure a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set; and transmit the first SSB burst set and the second SSB burst set to a user equipment (UE).

Aspect 30: A user equipment (UE) configured for wireless communication, comprising: a processor; a transceiver communicatively coupled to the processor; and a memory communicatively coupled to the processor, wherein the processor and the memory are configured to: receive a first synchronization signal block (SSB) burst set and a second synchronization signal block (SSB) burst set, wherein the first SSB burst set and the second SSB burst sets are each configured according to a respective set of parameters and the respective set of parameters differs between the first SSB burst set and the second SSB burst set; and identify at least one characteristic of the second SSB burst set based on a configuration of the first SSB burst set.

Aspect 31: An apparatus configured for wireless communication comprising at least one means for performing a method of any one of aspects 1 through 15 or aspects 16 through 28.

Aspect 32: A non-transitory computer-readable medium storing computer-executable code, comprising code for causing an apparatus to perform a method of any one of aspects 1 through 15 or aspects 16 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIG. 1-7, 9, 11, or 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a base station in a wireless communication network, the method comprising:
    configuring a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set, wherein the first SSB burst set is configured to indicate at least one characteristic of the second SSB burst set, and wherein at least one SSB in the first SSB burst set indicates a first physical-layer cell identity (PCID) that is configured to have a predetermined relationship with a second PCID used with the second SSB burst set; and
    transmitting the first SSB burst set and the second SSB burst set to a user equipment (UE).

2. The method of claim 1, wherein each SSB in at least one of the first SSB burst set or the second SSB burst set is configured to selectively include one or more of a primary synchronization signal (PSS), a secondary synchronization signal (SSS), or a physical broadcast channel (PBCH).

3. The method of claim 2, wherein the configuring the first SSB burst set and the second SSB burst set further comprises configuring the respective set of parameters for each of the first SSB burst set and the second SSB burst set, wherein each of the respective set of parameters comprises at least one of a period of transmission of SSBs, a number of the SSBs, or a sub carrier spacing (SCS) for the SSBs.

4. The method of claim 3, further comprising configuring the first SSB burst set with a first SCS and the second SSB burst set with a second SCS that is different from the first SCS.

5. The method of claim 1, further comprising:
    generating at least one SSB in the first SSB burst set to include resource allocation information for the second SSB burst set; and
    transmitting the first SSB burst set including the at least one SSB.

6. The method of claim 5, wherein the resource allocation information comprises one or more of locations of SSBs in the second SSB burst set, a period of transmission of the SSBs within the second SSB burst set, or a subcarrier spacing (SCS) of the SSBs within the second SSB burst set.

7. The method of claim 6, wherein the first SSB burst set is configured with a first SCS and the second SSB burst set is configured with a second SCS that is different from the first SCS.

8. The method of claim 1, wherein the predetermined relationship comprises the second PCID being equal to a function of the first PCID.

9. The method of claim 8, wherein the function of the first PCID comprises the second PCID being equal to mod (the first PCID+N, M), where mod represents a modulo operation, N is a predetermined integer number, and M is a maximum number of possible PCIDs in the wireless communication network.

10. The method of claim 1, further comprising:
    transmitting radio resource control (RRC) signaling to the UE for communicating the predetermined relationship.

11. The method of claim 1, further comprising:
generating a first plurality of transmission beams, each of which corresponds to a respective SSB in the first SSB burst set; and
generating a second plurality of transmission beams, each of which corresponds to a respective SSB in the second SSB burst set, wherein a transmission beam in the first plurality of transmission beams for the first SSB burst set is quasi co-located (QCLed) with at least one corresponding transmission beam of the second plurality of transmission beams for the second SSB burst set.

12. The method of claim 11, wherein QCLed transmission beams in the first and second plurality of transmission beams have a same beam width.

13. The method of claim 11, wherein the generating the second plurality of transmission beams further comprises:
quasi co-locating two or more transmission beams of the second plurality of transmission beams for the second SSB burst set with a single transmission beam in the first plurality of transmission beams for the first SSB burst set based on a number of SSBs in the second SSB burst set being equal to a multiple number of a number of SSBs in the first SSB burst set.

14. The method of claim 13, wherein a first width of a first transmission beam in the first plurality of transmission beams is at least twice a second width of a second transmission beam in the second plurality of transmission beams.

15. A base station configured for wireless communication, comprising:
a processor;
a transceiver communicatively coupled to the processor; and
a memory communicatively coupled to the processor, wherein the processor and the memory are configured to:
configure a first synchronization signal block (SSB) burst set and a second synchronization signal block (SSB) burst set, wherein the first SSB burst set and the second SSB burst set are configured according to a respective set of parameters and the respective set of parameters differs between the first and second SSB burst set, wherein the first SSB burst set is configured to indicate at least one characteristic of the second SSB burst set, and wherein at least one SSB in the first SSB burst set indicates a first physical-layer cell identity (PCID) that is configured to have a predetermined relationship with a second PCID used with the second SSB burst set; and
transmit the first SSB burst set and the second SSB burst set to a user equipment (UE).

16. A method of wireless communication at a user equipment (UE) in a wireless communication network, the method comprising:
receiving a first synchronization signal block (SSB) burst set and a second synchronization signal block (SSB) burst set, wherein the first SSB burst set and the second SSB burst set are each configured according to a respective set of parameters and the respective set of parameters differs between the first SSB burst set and the second SSB burst set, wherein the first SSB burst set comprises at least one SSB comprising a first physical-layer cell identity (PCID) that is configured to have a predetermined relationship with a second PCID used with the second SSB burst set; and
identifying at least one characteristic of the second SSB burst set based on a configuration of the first SSB burst set.

17. The method of claim 16, wherein the first SSB burst set is configured with a first subcarrier spacing (SCS) and the second SSB burst set is configured with a second SCS that is different from the first SCS.

18. The method of claim 16, wherein the first SSB burst set comprises at least one SSB comprising resource allocation information concerning at least the second SSB burst set; and wherein the identifying further comprises:
identifying the at least one characteristic of the second SSB burst set based on the resource allocation information.

19. The method of claim 18, wherein the at least one characteristic comprises a location of the second SSB burst set in wireless resources.

20. The method of claim 18, wherein the resource allocation information comprises one or more of locations of SSBs in the second SSB burst set, a period of transmission of the SSBs within the second SSB burst set, or a subcarrier spacing (SCS) of the SSBs within the second SSB burst set.

21. The method of claim 16, wherein the identifying further comprises:
identifying the at least one characteristic based on the first PCID, wherein the at least one characteristic is the second PCID determined based on the first PCID.

22. The method of claim 16, wherein the predetermined relationship comprises the second PCID being equal to a function of the first PCID.

23. The method of claim 22, wherein the function of the first PCID comprises the second PCID being equal to mod (the first PCID+N, M), where mod represents a modulo operation, N is a predetermined integer number, and M is a maximum number of possible PCIDs in the wireless communication network.

24. The method of claim 21, further comprising:
receiving radio resource control (RRC) signaling that communicates the predetermined relationship for determining the second PCID.

25. The method of claim 16, further comprising:
receiving a first plurality of transmission beams, each of which corresponds to a respective SSB in the first SSB burst set; and
receiving a second plurality of transmission beams, each of which corresponds to a respective SSB in the second SSB burst set, wherein a transmission beam in the first plurality of transmission beams for the first SSB burst set is quasi co-located (QCLed) with at least one corresponding transmission beam of the second plurality of transmission beams for the second SSB burst set;
wherein the at least one characteristic of the second SSB burst set may be determined based on QCLed transmission beams in the first and second SSB burst sets.

26. The method of claim 25, wherein the QCLed transmission beams in the first and second plurality of transmission beams have a same beam width.

27. The method of claim 25, wherein the second plurality of transmission beams further comprises two or more transmission beams of the second plurality of transmission beams for the second SSB burst set quasi co-located with a single transmission beam in the first plurality of transmission beams for the first SSB burst set based on a number of SSBs in the second SSB burst set being equal to a multiple number of a number of SSBs in the first SSB burst set.

28. The method of claim 27, wherein a first width of a first transmission beam in the first plurality of transmission beams is at least twice a second width of a second transmission in the second plurality of transmission beams.

29. A user equipment (UE) configured for wireless communication, comprising:
- a processor;
- a transceiver communicatively coupled to the processor; and
- a memory communicatively coupled to the processor, wherein the processor and the memory are configured to:
  - receive a first synchronization signal block (SSB) burst set and a second synchronization signal block (SSB) burst set, wherein the first SSB burst set and the second SSB burst set are each configured according to a respective set of parameters and the respective set of parameters differs between the first SSB burst set and the second SSB burst set, wherein the first SSB burst set comprises at least one SSB comprising a first physical-layer cell identity (PCID) that is configured to have a predetermined relationship with a second PCID used with the second SSB burst set; and
  - identify at least one characteristic of the second SSB burst set based on a configuration of the first SSB burst set.

* * * * *